US011216213B2

(12) United States Patent
Yamamoto et al.

(10) Patent No.: US 11,216,213 B2
(45) Date of Patent: Jan. 4, 2022

(54) TRANSMISSION APPARATUS, METHOD OF CONTROLLING TRANSMISSION APPARATUS, AND CABLE

(71) Applicant: SONY CORPORATION, Tokyo (JP)

(72) Inventors: Masanari Yamamoto, Kanagawa (JP); Hiroshi Morita, Kanagawa (JP); Kazuaki Toba, Kanagawa (JP); Kazuo Yamamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 16/631,209

(22) PCT Filed: Jul. 18, 2018

(86) PCT No.: PCT/JP2018/026839
§ 371 (c)(1),
(2) Date: Jan. 15, 2020

(87) PCT Pub. No.: WO2019/021901
PCT Pub. Date: Jan. 31, 2019

(65) Prior Publication Data
US 2020/0142639 A1    May 7, 2020

(30) Foreign Application Priority Data
Jul. 24, 2017    (JP) .............................. JP2017-143134

(51) Int. Cl.
*G06F 13/16*    (2006.01)
*G06F 3/06*    (2006.01)
(Continued)

(52) U.S. Cl.
CPC .......... *G06F 3/0659* (2013.01); *G06F 3/0604* (2013.01); *G06F 3/0673* (2013.01);
(Continued)

(58) Field of Classification Search
None
See application file for complete search history.

(56) References Cited

U.S. PATENT DOCUMENTS 8,843,679 B2 *  9/2014  Toba ...................... G09G 5/006
                                                         710/62
10,216,683 B2 *  2/2019  Yeh ..................... G06F 13/4081
(Continued)

FOREIGN PATENT DOCUMENTS

CN           1898658 A    1/2007
CN         103141063 A    6/2013
(Continued)

OTHER PUBLICATIONS

International Search Report and Written Opinion of PCT Application No. PCT/JP2018/026839, dated Oct. 23, 2018, 10 pages of ISRWO.

*Primary Examiner* — Elias Mamo
(74) *Attorney, Agent, or Firm* — Chip Law Group

(57) ABSTRACT

A transmission apparatus is capable of accessing a register of a cable satisfactorily. An inquiry about the presence or absence of a register in a cable connected between the transmission apparatus and a reception apparatus is performed. In response to the inquiry, information indicating the presence or absence of the register is received from the cable. When the information indicates the presence of the register, the register of the cable is accessed so that acquisition of storage data or writing in the storage data is performed.

21 Claims, 34 Drawing Sheets

(51) Int. Cl.
*H04N 21/4363* (2011.01)
*G06F 1/26* (2006.01)

(52) U.S. Cl.
CPC ... *G06F 13/1668* (2013.01); *H04N 21/43635* (2013.01); *G06F 1/266* (2013.01)

(56) References Cited

U.S. PATENT DOCUMENTS

| | | |
|---|---|---|
| 2005/0182876 A1 | 8/2005 | Kim et al. |
| 2006/0031611 A1* | 2/2006 | Konda ............... H04N 7/22 710/72 |
| 2011/0091219 A1* | 4/2011 | Tatum ............... G02B 6/4246 398/142 |
| 2013/0191563 A1 | 7/2013 | Toba et al. |
| 2015/0317092 A1 | 11/2015 | Tanoue et al. |
| 2017/0006336 A1* | 1/2017 | Lee ................ H04L 1/0045 |
| 2017/0116146 A1* | 4/2017 | Liu ................ G06F 13/4282 |

FOREIGN PATENT DOCUMENTS

| | | |
|---|---|---|
| JP | 2004-260742 A | 9/2004 |
| JP | 2007-535235 A | 11/2007 |
| JP | 2012-075067 A | 4/2012 |
| JP | 2012-124808 A | 6/2012 |
| JP | 2015-111418 A | 6/2015 |
| KR | 10-2006-0106842 A | 10/2006 |
| KR | 10-2014-0007324 A | 1/2014 |
| WO | 2014/112090 A1 | 7/2014 |

\* cited by examiner

TRANSMISSION APPARATUS, METHOD OF CONTROLLING TRANSMISSION APPARATUS, AND CABLE

CROSS REFERENCE TO RELATED APPLICATIONS

This application is a U.S. National Phase of International Patent Application No. PCT/JP2018/026839 filed on Jul. 18, 2018, which claims priority benefit of Japanese Patent Application No. JP 2017-143134 filed in the Japan Patent Office on Jul. 24, 2017. Each of the above-referenced applications is hereby incorporated herein by reference in its entirety.

TECHNICAL FIELD

The present technology relates to a transmission apparatus, a method of controlling a transmission apparatus, and a cable, and particularly to, for example, a transmission apparatus that can access a register retained by a cable.

BACKGROUND ART

In recent years, high definition multimedia interface (HDMI) or the like has been used as a digital interface for connecting consumer electronics (CE) apparatuses. For example, Patent Document 1 describes the HDMI standard. In the HDMI standard, respective signals of video, audio, and control are transmitted as digital signals, with three data differential line pairs (transition minimized differential signaling (TMDS) Channel 0/1/2).

CITATION LIST

Patent Document

Patent Document 1: Japanese Patent Application Laid-Open No. 2015-111418

SUMMARY OF THE INVENTION

Problems to be Solved by the Invention

In order to guarantee the transmission quality of high-speed transmission, various specifications have been established for cables. As one of the schemes for determining the cable specifications, it has been conceived to make a cable have, in the cable, a register that retains specification data for identifying the cable specification.

In this case, when a source apparatus accesses the register of the cable through a display data channel (DDC) line or the like, the access information is also simultaneously transmitted to a sink apparatus via the cable. As a result, it is likely that malfunction occurs in the sink apparatus in which the corresponding address is not defined.

An object of the present technology is to provide a transmission apparatus capable of accessing a register of a cable satisfactorily.

Solutions to Problems

One concept of the present technology is in a transmission apparatus including:

an inquiry unit configured to perform an inquiry about presence or absence of a register to a cable connected between the transmission apparatus and a reception apparatus;

an information reception unit configured to receive information indicating the presence or absence of the register from the cable in response to the inquiry; and an access unit configured to access the register to acquire storage data or write in the storage data, when the information indicates the presence of the register.

In the present technology, the inquiry about the presence or absence of the register to the cable connected between the transmission apparatus and the reception apparatus is performed by the inquiry unit. For example, the specification data of the cable has been stored in the register. For example, the inquiry unit may perform the inquiry after power is supplied to the reception apparatus via the cable.

In response to the inquiry, information indicating the presence or absence of the register from the cable is received by the information reception unit. For example, the information reception unit may perform reading of function information regarding the reception apparatus through the cable, on the basis of a connection sensed signal from the cable, and receives the information indicating the presence or absence of the register. In this case, for example, the cable may serve as a high definition multimedia interface (HDMI) cable, and the information reception unit may receive the connection sensed signal through a hot plug detect (HPD) line and may read the function information through a display data channel (DDC) line.

As described above, in the present technology, access to the register is performed when the information indicating the presence or absence of the register from the cable indicates the presence of the register. Therefore, register access is not performed for a cable having no register, and transmission of access information to a sink apparatus via the cable can be suppressed, so that malfunction can be prevented from occurring in the sink apparatus in which the corresponding address is not defined.

Furthermore, another concept of the present technology is in a cable to be connected between a transmission apparatus and a reception apparatus, the cable including:

a register;

an inquiry reception unit configured to receive an inquiry about presence or absence of the register from the transmission apparatus;

an information providing unit configured to provide information indicating the presence of the register to the transmission apparatus in response to the inquiry; and a buffer unit configured to perform blocking when access to the register is made from the transmission apparatus, such that information regarding the access is not sent to the reception apparatus.

The cable of the present technology includes the register. For example, the register may store the specification data of the cable. The inquiry about the presence or absence of the register from the transmission apparatus is received by the inquiry reception unit. For example, the inquiry reception unit may receive the inquiry after receiving a connection sensed signal sent from the reception apparatus corresponding to power supplied from the transmission apparatus to the reception apparatus via the cable.

In response to the inquiry, information indicating the presence of the register is provided to the transmission apparatus, by the information providing unit. For example, after reading function information from the reception apparatus, adding information indicating the presence of the register to the function information, and retaining the function information with the information indicating the presence of the register, the information providing unit may send a connection sensed signal to the transmission apparatus and cause the transmission apparatus to read the retained function information. When the access to the register is made from the transmission apparatus, the blocking is performed by the buffer unit such that the information regarding the access is not sent to the reception apparatus.

As described above, in the present technology, when the inquiry about the presence or absence of the register has been made from the transmission apparatus, the information indicating the presence of the register is provided to the transmission apparatus. Therefore, it is recognized that the cable retains the register, and access to the register can be performed to acquire storage data, in the transmission apparatus. Furthermore, when the access to the register is made from the transmission apparatus, blocking is performed such that the information regarding the access is not sent to the reception apparatus.

Therefore, transmission of the access information to a sink apparatus can be suppressed, so that malfunction can be prevented from occurring in the sink apparatus in which the corresponding address is not defined.

Furthermore, yet another concept of the present technology is in a transmission apparatus including:

a sensing unit configured to sense that a register is present in a cable connected between the transmission apparatus and a reception apparatus; and an access unit configured to access, when the presence of the register is sensed, the register to acquire storage data or write in the storage data.

In the present technology, presence of the register in the cable connected between the transmission apparatus and the reception apparatus is sensed by the sensing unit. For example, the register may store the specification data of the cable. For example, the sensing unit may sense that the register is present in the cable, on the basis of a notification signal indicating the presence of the register sent from the cable. In this case, for example, the sensing unit may receive pulse information provided on a predetermined line of the cable, as the notification signal. Furthermore, the sensing unit may sense that the register is present in the cable, with a mechanical mechanism.

As described above, in the present technology, when it is sensed that the register is present in the cable, the register is accessed. Therefore, register access is not performed for a cable having no register, and transmission of access information to a sink apparatus via the cable can be suppressed, so that malfunction can be prevented from occurring in the sink apparatus in which the corresponding address is not defined.

Furthermore, yet another concept of the present technology is in a cable to be connected between a transmission apparatus and a reception apparatus, the cable including:

a register;

an information providing unit configured to provide information indicating presence of the register to the transmission apparatus; and a buffer unit configured to perform blocking when access to the register is made from the transmission apparatus, such that information regarding the access is not sent to the reception apparatus.

The cable of the present technology includes the register. For example, the register may store the specification data of the cable. Information indicating the presence of the register is provided to the transmission apparatus, by the information providing unit. For example, the information providing unit may provide the information indicating the presence of the register to the transmission apparatus through a predetermined line of the cable. Furthermore, for example, the information providing unit may provide the information indicating the presence of the register to the transmission apparatus, with a mechanical mechanism. When the access to the register is made from the transmission apparatus, the blocking is performed by the buffer unit such that the information regarding the access is not sent to the reception apparatus.

As described above, in the present technology, the information indicating the present of the register is provided to the transmission apparatus. Therefore, it is recognized that the cable retains the register, and access to the register can be performed to acquire storage data, in the transmission apparatus. Furthermore, when the access to the register is made from the transmission apparatus, blocking is performed such that the information regarding the access is not sent to the reception apparatus. Therefore, transmission of the access information to the reception apparatus can be suppressed, and malfunction can be prevented from occurring in the reception apparatus in which the corresponding address is not defined.

Furthermore, yet another concept of the present technology is in a transmission apparatus including:

a notification unit configured to issue notification that a predetermined current is suppliable to a cable connected between the transmission apparatus and a reception apparatus.

In the present technology, it is notified that the predetermined current is suppliable to the cable connected between the transmission apparatus and the reception apparatus, by the notification unit. For example, the notification unit may issue the notification, with a mechanical mechanism.

As described above, in the present technology, it is notified that the predetermined current is suppliable to the cable. Therefore, in the cable, control can be performed such that power supply is received only when the transmission apparatus can supply the predetermined current.

Furthermore, yet another concept of the present technology is in a cable to be connected between a transmission apparatus and a reception apparatus, the cable including:

a reception unit configured to receive notification that a predetermined current is suppliable from the transmission apparatus; and a control unit configured to perform control such that the supply of the current is received from the transmission apparatus after the reception of the notification.

In the present technology, the notification that the predetermined current is suppliable from the transmission apparatus is received by the reception unit. For example, the reception unit may receive the notification, with a mechanical mechanism. The control is performed by the control unit such that the supply of the current is received from the transmission apparatus after the reception of the notification.

As described above, in the present technology, the control is performed such that the supply of the current is received from the transmission apparatus after the reception of the notification that the predetermined current is suppliable from the transmission apparatus. Therefore, for example, at the cable, the supply of current from the transmission apparatus can be received without preventing the transmission apparatus from reading the function information from the reception apparatus.

Effects of the Invention

According to the present technology, a transmission apparatus can access a register of a cable satisfactorily. Note that the effects described in the present specification are merely exemplified and are not intended to be limiting and there may be additional effects.

MODE FOR CARRYING OUT THE INVENTION

Hereinafter, modes for carrying out the invention (hereinafter referred to as "embodiments") will be described. Note that the description will be given in the following order.

1. Embodiments
2. Modifications

1. Embodiments

[Configuration of Transmission System]

Figure 1:
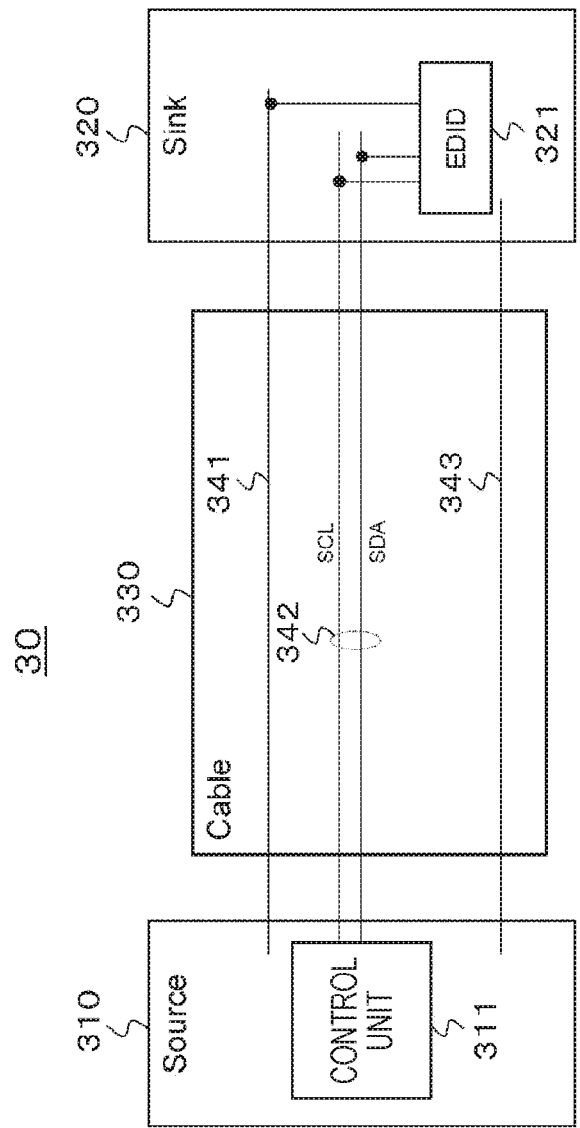
FIG. 1 illustrates an exemplary configuration of a conventional transmission system.

FIG. 1 illustrates an exemplary configuration of a transmission system 30. The transmission system 30 is a high definition multimedia interface (HDMI) transmission system with HDMI as a digital interface. The transmission system 30 includes a source apparatus 310 serving as a transmission apparatus, a sink apparatus 320 serving as a reception apparatus, and an HDMI cable 330 that makes connection between the source apparatus 310 and the sink apparatus 320.

Power is supplied from the source apparatus 310 to the sink apparatus 320 through a +5-V power line 341. Accompanying the supply, a connection sensed signal is sent from the sink apparatus 320 to the source apparatus 310 through a hot plug detect (HPD) line 343. On the basis of reception of the connection sensed signal, a control unit 311 of the source apparatus 310 reads, with a display data channel (DDC) line (serial data (SDA) line and serial clock (SCL) line), extended display identification data (EDID) including function information, from an EDID ROM 321 of the sink apparatus 320, and grasps a function of the sink apparatus 320.

Figure 2:
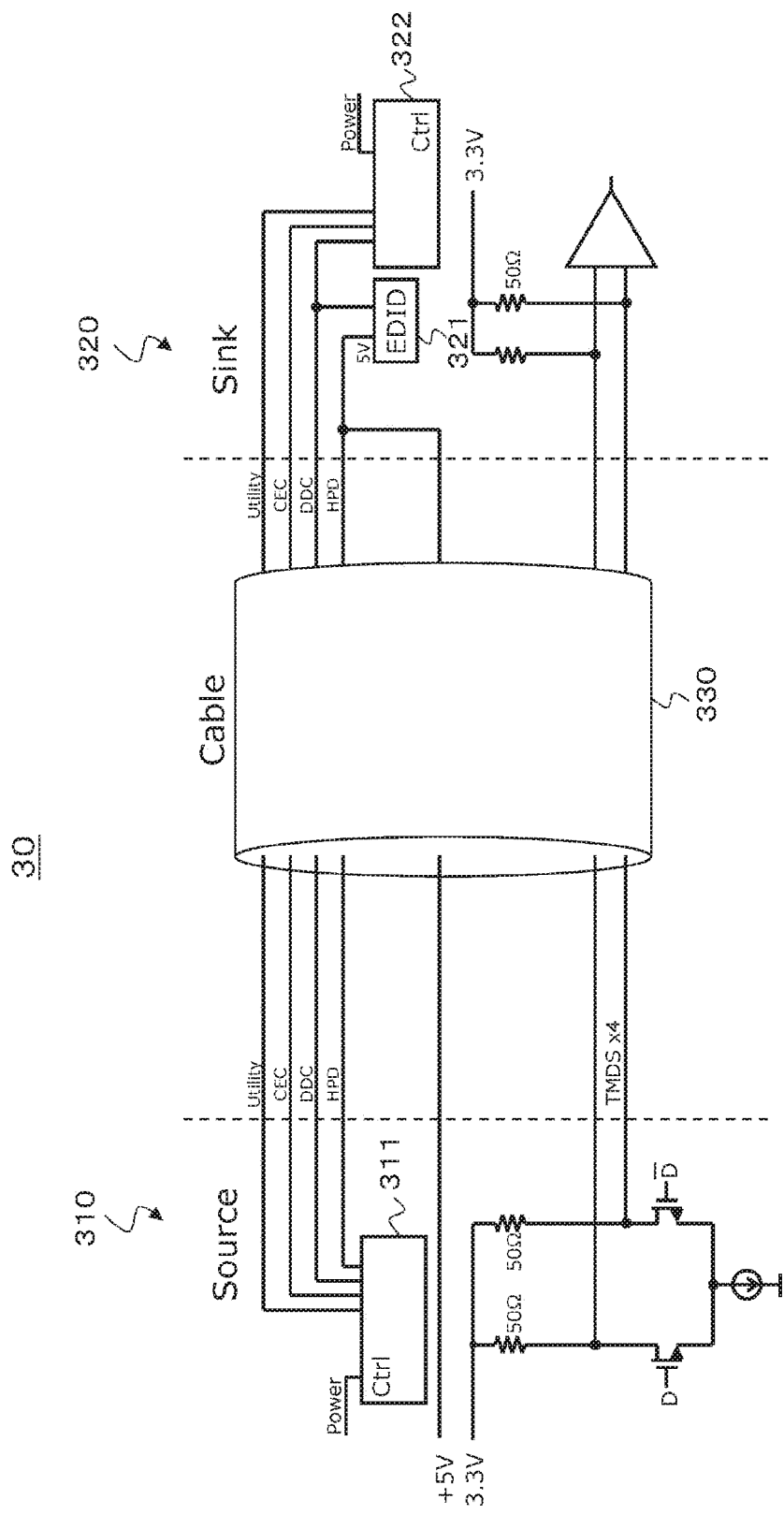
FIG. 2 illustrates an exemplary detailed configuration of the transmission system illustrated in FIG. 1.

FIG. 2 illustrates an exemplary detailed configuration of the transmission system 30. The transmission channels of the transmission system 30 include three transition minimized differential signaling (TMDS) channels for transmitting, as digital signals, respective signals of video, audio, and control in TMDS data, and one TMDS clock channel for transmitting clock signals. Each TMDS channel has two differential signal lines. In the illustrated example, only one channel is illustrated.

Furthermore, the control signal lanes of an HDMI system include the display data channel (DDC) line, a consumer electronics control (CEC) line, an HPD line, a Utility line, and a +5-V power line. The DDC line has two signal lines, an SDA line and an SCL line included in the cable 330. The DDC line is used for reading EDID from the EDID ROM 321 of the sink apparatus 320 by the source apparatus 310. The CEC line is used to perform bidirectional communication of data for control, between the source apparatus 310 and the sink apparatus 320.

For the TMDS channel, a current driven type for transmitting "0" and "1" of data by drawing current to the source apparatus 310 side from a 50Ω termination resistor linked to the sink apparatus 320 side is used. At this time, signals are transmitted differentially on the basis of differential signals of D and D (bar). Note that, in the illustrated example, use of a 50Ω termination resistor on the source apparatus 310 side is exemplified; however, TMDS also enables driving with only the 50Ω termination resistor on the sink apparatus side without using the 50Ω termination resistor on the source apparatus 310 side.

The HDMI standard prescribes the sequence when the cable 330 is connected. When one end and the other end of a plug of the cable 330 are respectively connected to the source apparatus 310 and the sink apparatus 320, a voltage of 5 V is transmitted from the source apparatus 310 to the sink apparatus 320 via the +5-V power line. When the transmitted 5 V is sensed in the sink apparatus 320, and the sensed 5 V is transmitted from the sink apparatus 320 to the source apparatus 310 via the HPD line. Thus, notification is issued, to the source apparatus 310, that the cable has been linked correctly.

When sensing 5 V applied to the HPD line, the control unit 311 of the source apparatus 310 determines that the cable 330 has been linked, and attempts to read, with the DDC line, the EDID in the EDID ROM 321 on the sink apparatus 320 side. Thereafter, with a control line such as the DDC line, exchange of signals such as high-bandwidth digital content protection system (HDCP) starts between the source apparatus 310 and the sink apparatus 320, and unidirectional transmission of TMDS data with the TMDS channels starts from the source apparatus 310 to the sink apparatus 320.

Use of a register prepared for a control unit 322 on the sink apparatus 320 side enables information exchange between the source apparatus 310 and the sink apparatus 320.

Figure 3:
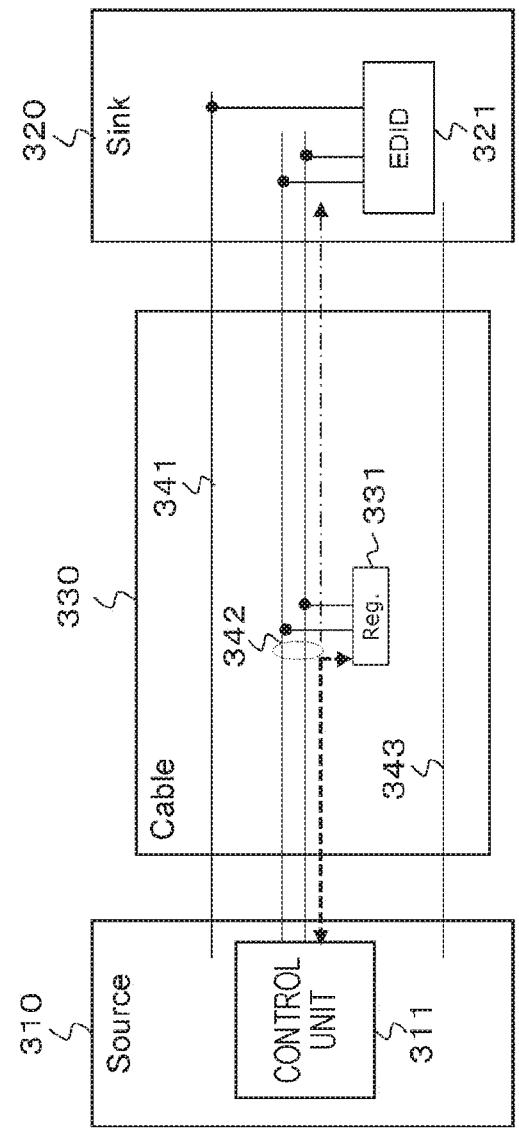
FIG. 3 illustrates an exemplary configuration of a transmission system.
Figure 4:
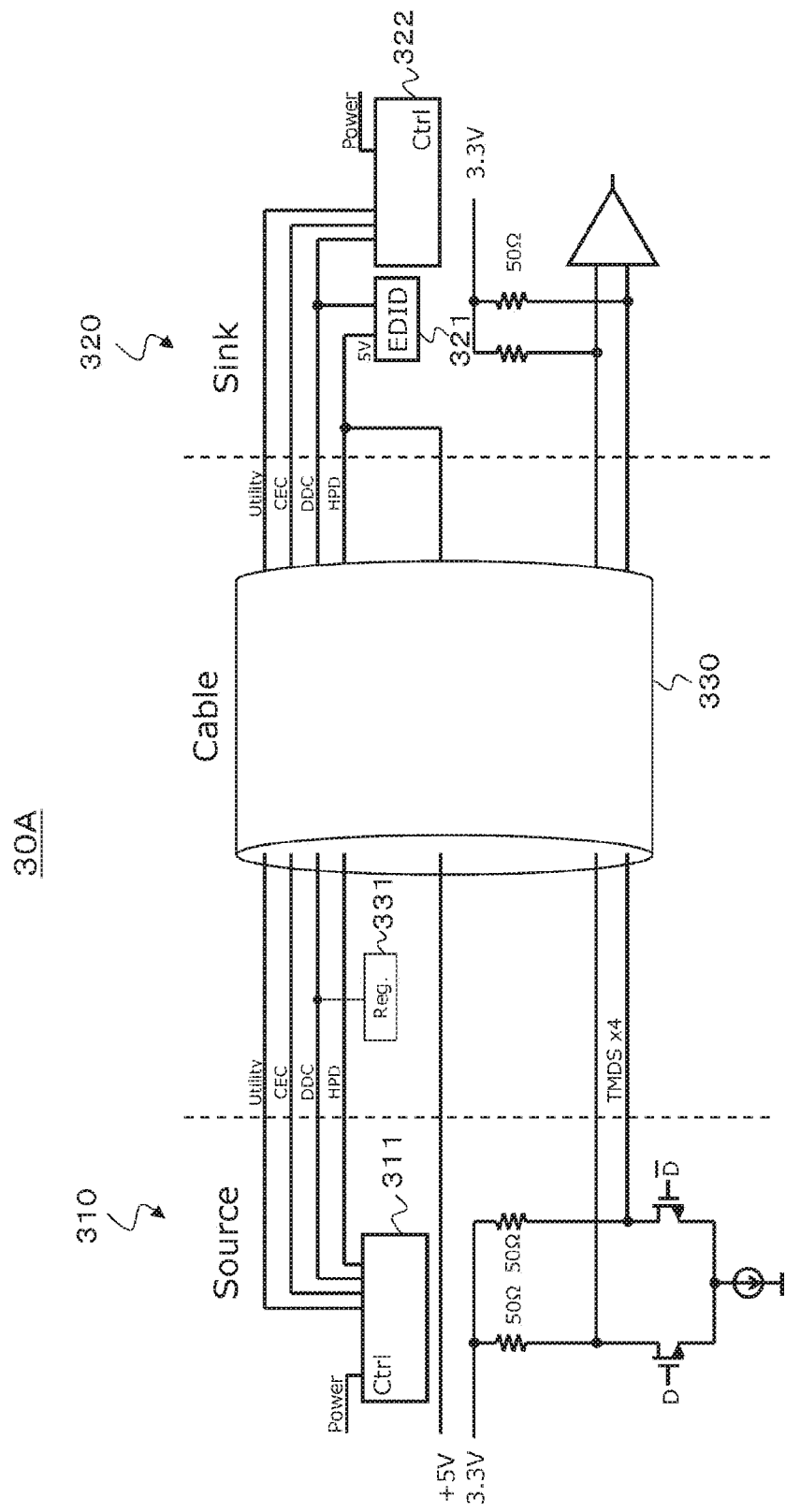
FIG. 4 illustrates an exemplary detailed configuration of the transmission system illustrated in FIG. 3.

In a case where a register is prepared for the cable 330 to attempt information exchange between the source apparatus 310 and the cable 330, as illustrated in a transmission system 30A in FIGS. 3 and 4, it is conceivable that a register 331 is arranged parallel to a DDC line in a cable 330. Note that, in FIGS. 3 and 4, parts corresponding to those in FIGS. 1 and 2 are denoted by the same reference signs, and detailed description of the corresponding parts will be omitted appropriately.

In a case of this arrangement, on accessing a new address of the register 331 of the cable 330, the source apparatus 310 also accesses a sink apparatus 320. In a case where access to an unintended address has been made, it is likely that the sink apparatus 320 malfunctions.

Figure 5:
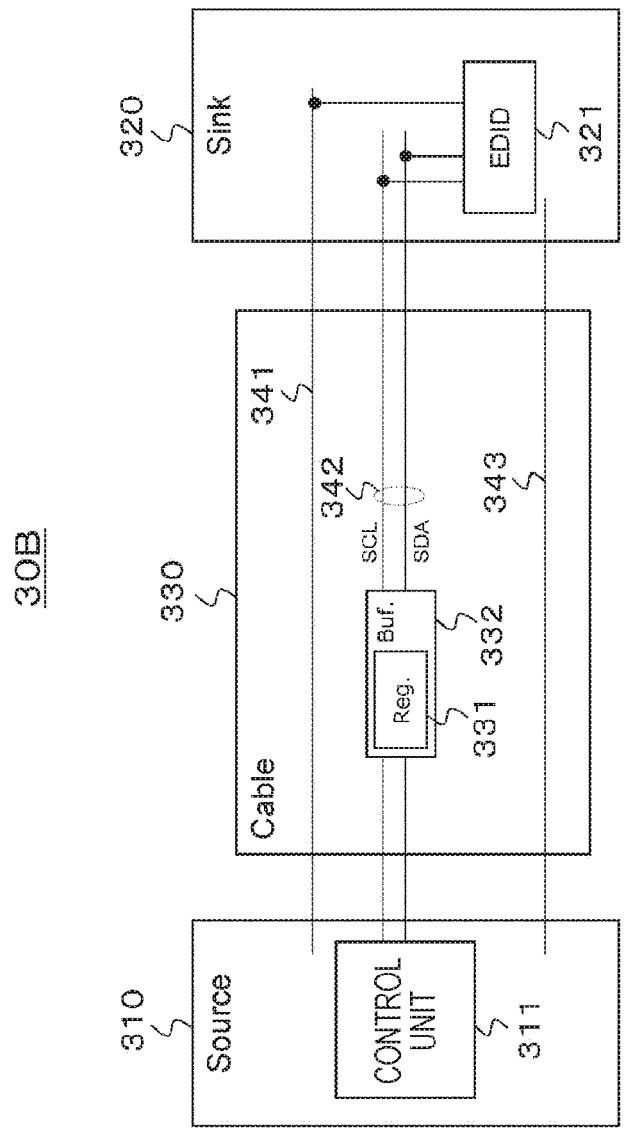
FIG. 5 illustrates an exemplary configuration of a transmission system.
Figure 6:
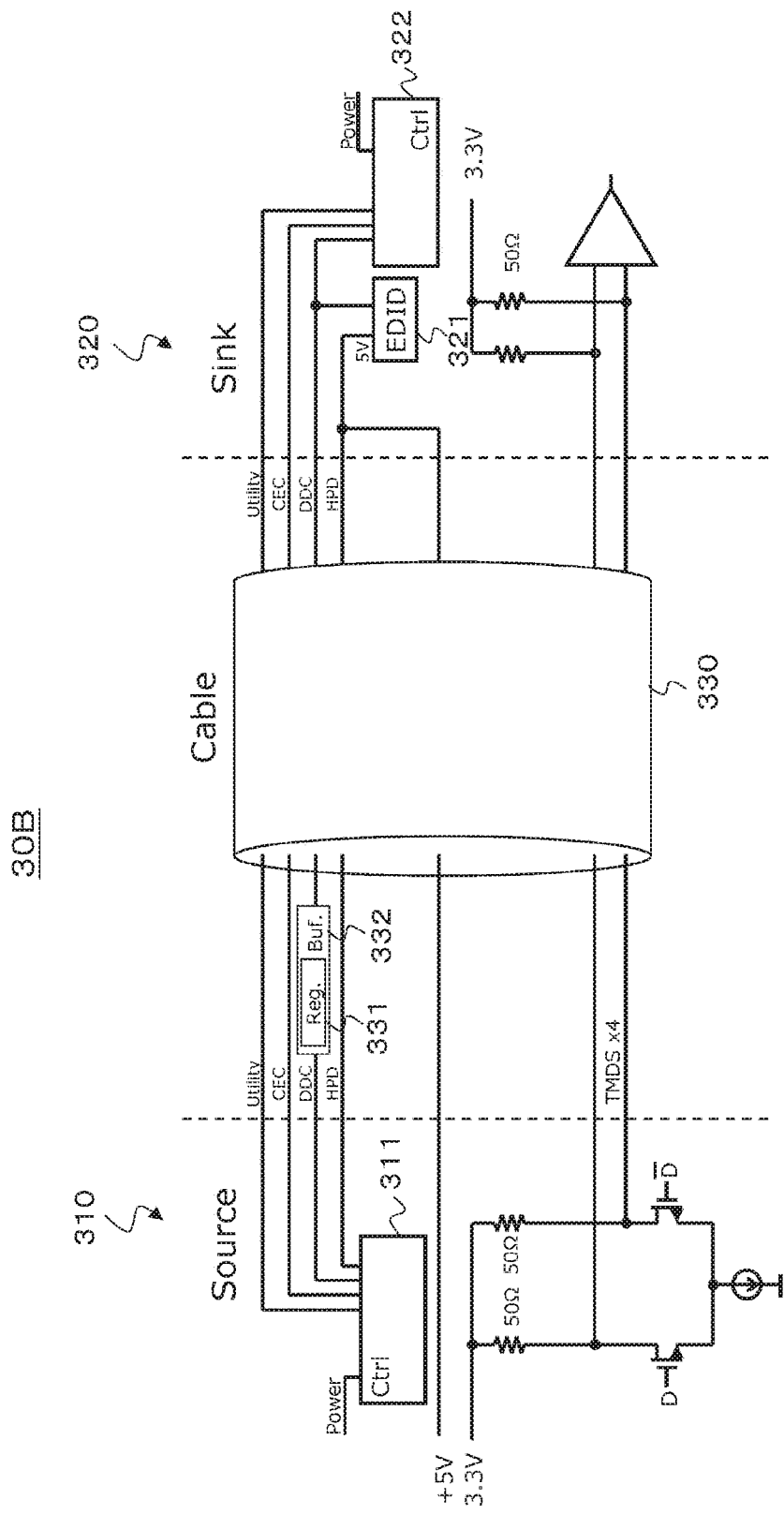
FIG. 6 illustrates an exemplary detailed configuration of the transmission system illustrated in FIG. 5.

In order to avoid the access, as illustrated in a transmission system 30B in FIGS. 5 and 6, for avoiding a DDC signal from directly linking to a sink apparatus 320, a method is conceivable in which a DDC line is once received at a buffer unit 332 in a cable 330 and then information except a new address is passed to the sink apparatus 320 side. Note that, in FIGS. 5 and 6, parts corresponding to those in FIGS. 1 to 4 are denoted by the same reference signs, and detailed description of the corresponding parts will be omitted appropriately.

The method is viable in a case of a cable 330 having a new address. However, in a case where the cable 330 that is already available commercially and has no new address (see FIGS. 1 and 2) or the cable 330 with the register 331 arranged in parallel to the DDC line (see FIGS. 3 and 4) has connected to the source apparatus 310 that attempts to access a new address, access to a new address of the sink apparatus 320 is made from the source apparatus 310. Thus, it is still likely that the sink apparatus 320 malfunctions.

First Embodiment

Figure 7:
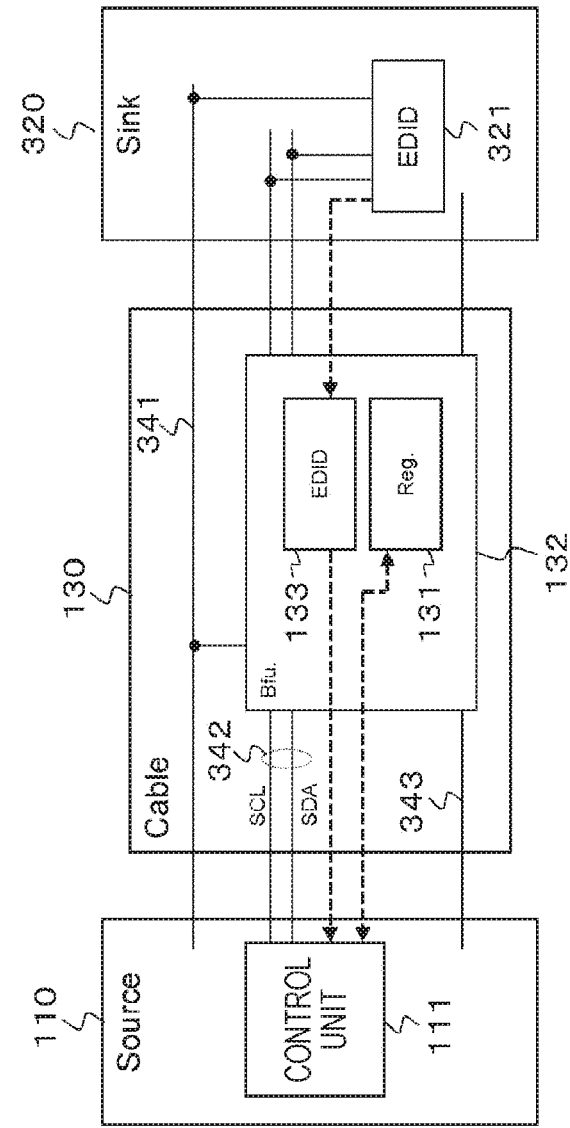
FIG. 7 illustrates an exemplary configuration of a transmission system as a first embodiment.

FIG. 7 illustrates an exemplary configuration of a transmission system 10-1 as a first embodiment. The transmission system 10-1 is a high definition multimedia interface (HDMI) transmission system with HDMI as a digital interface. The transmission system 10-1 includes a source apparatus 110 serving as a transmission apparatus, a sink apparatus 320 serving as a reception apparatus, and an HDMI cable 130 that makes connection between the source apparatus 110 and the sink apparatus 320. In FIG. 7, parts corresponding to those in FIG. 1 are illustrated with the same reference signs given.

In the cable 130, a buffer unit 132 is interposed between a display data channel (DDC) line 342 and a hot plug detect (HPD) line 343. The buffer unit 132 has a register 131 having stored, for example, the specification data of the cable 130 (also including characteristic data of the cable 130), and a register 133 that temporarily stores extended display identification data (EDID) 321 read from the sink apparatus 320.

When the cable 130 is connected to the source apparatus 110 and the sink apparatus 320, power is supplied from the source apparatus 110 to the cable 130 through a power line 341, and power is also simultaneously supplied to the sink apparatus 320. At this time, a connection sensed signal (HPD signal) indicating that the connection between the apparatuses has been made is output from the HPD line 343 of the sink apparatus 320. However, it is desired that access from the source apparatus 110 to EDID until completion of EDID rewriting as described later is suspended. Thus, the connection sensed signal is input to the buffer unit 132 and blocked, so that the connection sensed signal is not transferred to the source apparatus 110 at this point of time.

Here, the buffer unit 132 having sensed the connection sensed signal accesses an EDID ROM 321 of the sink apparatus 320 through the DDC line 342, and temporarily saves the EDID that is the details thereof in the register 133 of the buffer unit 132.

Then, the buffer unit 132 rewrites the EDID of the sink apparatus 320 temporarily saved in the register 133 with addition of information indicating the presence of the register 131.

After rewriting the data, the buffer unit 132 transfers a connection sensed signal (HPD signal) to the source apparatus 110 through the HPD line 343. A control unit 111 of the source apparatus 110 having received the connection sensed signal attempts to access the EDID ROM 321 of the sink apparatus 320 through the DDC line 342. The buffer unit 132 having received the access to the EDID ROM 321 from the source apparatus 110 does not pass the access to the sink apparatus 320, and instead reads, from the register 133, the EDID rewritten, in the buffer unit 132, with addition of the information indicating the presence of the register 131 to send the rewritten EDID to the control unit 111 of the source apparatus 110.

The control unit 111 of the source apparatus 110 having received the EDID from the cable 130 senses that the cable 130 retains the register 131 and accesses the register 131 built in the cable 130 through the DCC line 342. At this time, the buffer unit 132 does not pass the access information from the control unit 111 of the source apparatus 110 to the register 131, to the sink apparatus 320.

The buffer unit 132 does not pass the access information from the control unit 111 of the source apparatus 110 to the EDID ROM 321 of the sink apparatus 320 and the access information to the register 131 in the buffer unit 132, to the sink apparatus 321. The other accesses to an address, however, are all passed through to the sink apparatus 320.

With this series of operations, when the cable 130 retaining the register 131 is connected, the source apparatus 110 accesses the register 131; however, the access information is not transferred to the sink apparatus 320. Therefore, malfunction can be prevented from occurring in a sink apparatus 320 in which the corresponding address is not defined. Furthermore, the source apparatus 110 can acquire specification data such as the transmission speed and the required current amount of the cable 130, from the register 131 of the cable 130, so that the source apparatus 110 becomes able to operate stably according to the specification.

Figure 8:
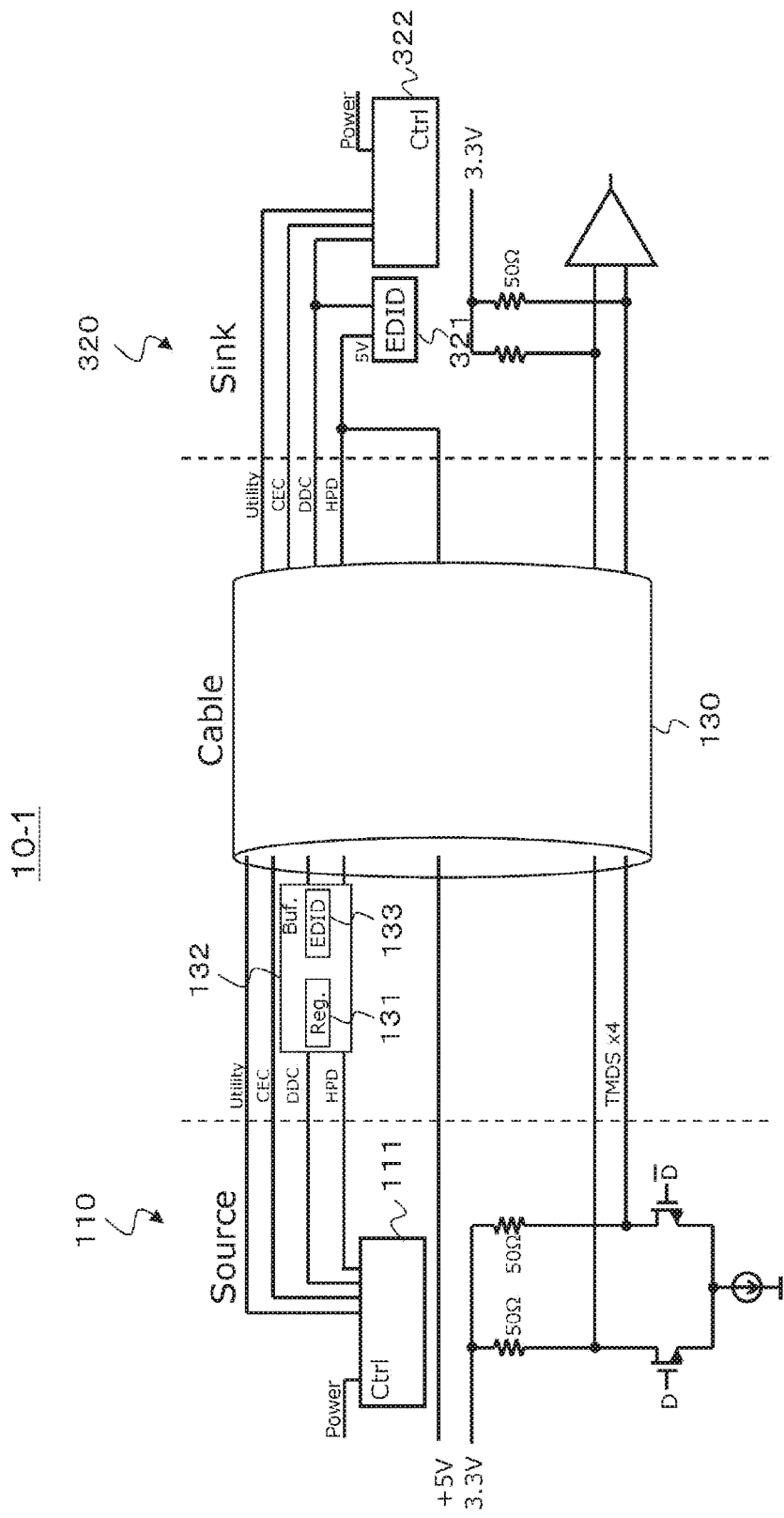
FIG. 8 illustrates an exemplary detailed configuration of the transmission system illustrated in FIG. 7.

FIG. 8 illustrates the transmission system 10-1 more specifically. In FIG. 8, parts corresponding to those in FIGS. 2 and 7 are denoted by the same reference signs, and detailed description of the corresponding parts will be omitted. The transmission channels of the transmission system 10-1 include three transition minimized differential signaling (TMDS) channels for transmitting, as digital signals, respective signals of video, audio, and control in TMDS data, and one TMDS clock channel for transmitting clock signals. Each TMDS channel has two differential signal lines. In the illustrated example, only one channel is illustrated.

Furthermore, the control signal lanes of an HDMI system include the display data channel (DDC) line, a consumer electronics control (CEC) line, an HPD line, a Utility line, and a +5-V power line. The DDC line has two signal lines, a serial data (SDA) line and a serial clock (SCL) line included in the cable 130. The DDC line is used for reading EDID from the EDID ROM 321 of the sink apparatus 320 by the source apparatus 110. The CEC line is used for performing bidirectional communication of data for control, between the source apparatus 110 and the sink apparatus 320.

For the TMDS channel, a current driven type for transmitting "0" and "1" 1 of data by drawing current to the source apparatus 110 side from a 50Ω termination resistor linked to the sink apparatus 320 side is used. At this time, signals are transmitted differentially on the basis of differential signals of D and D (bar). Note that, in the illustrated example, use of a 50Ω termination resistor on the source apparatus 110 side is exemplified; however, TMDS also enables driving with only the 50Ω termination resistor on the sink apparatus side without using the 50Ω termination resistor on the source apparatus 110 side.

In the cable 130, as described in FIG. 7, the buffer unit 132 is interposed between the DDC line and the HPD line. The buffer unit 132 has the register 131 present therein, the resistor having stored, for example, the specification data of the cable 130 (also including characteristic data of the cable 130), and the register 133 that temporarily stores the EDID read from the EDID ROM 321 of the sink apparatus 32.

Figure 9:
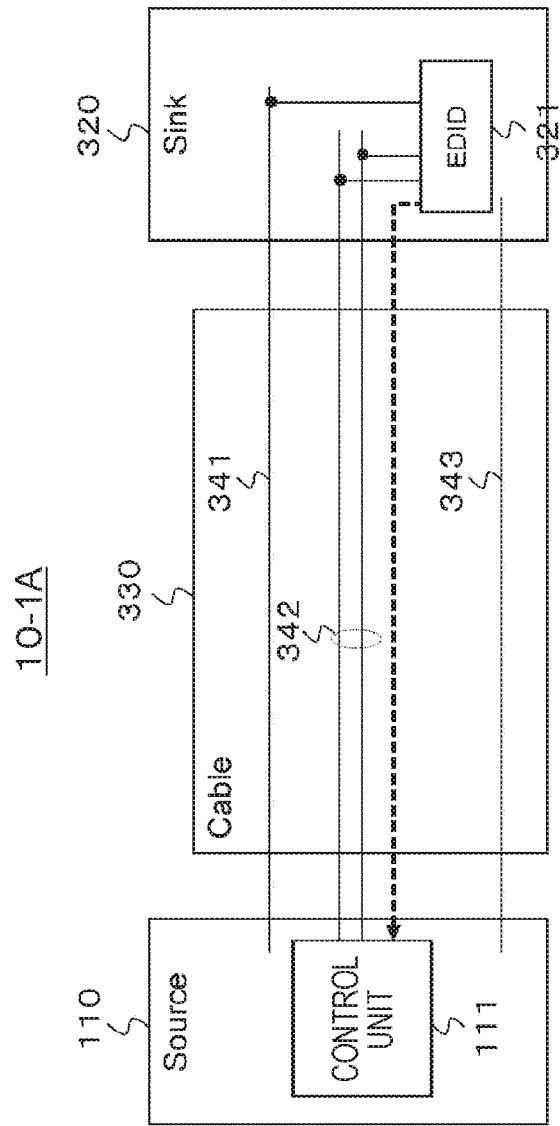
FIG. 9 illustrates an exemplary configuration of a transmission system.

Here, consider a case where a cable 130 with no register 131 built therein has been connected. FIG. 9 illustrates an exemplary configuration of a transmission system 10-1A in this case. The transmission system 10-1A includes a source apparatus 110 serving as a transmission apparatus, a sink apparatus 320 serving as a reception apparatus, and an HDMI cable 330 that makes connection between the source apparatus 110 and the sink apparatus 320. In FIG. 9, parts corresponding to those in FIGS. 1 and 7 are denoted by the same reference signs, and detailed description of the corresponding parts will be omitted.

When the cable 330 has been connected, a control unit 111 of the source apparatus 110 accesses an EDID ROM 321 of the sink apparatus 320. At this time, EDID to be read does not include information indicating that a register is retained in the cable. Therefore, the control unit 111 of the source apparatus 110 senses that the cable 330 with no register retained has been connected, and does not access a register. As a result, access information to a register retained in the cable is not transferred to the sink apparatus 320, and malfunction can be prevented from occurring in a sink apparatus 320 in which the corresponding address is not defined.

Figure 10:
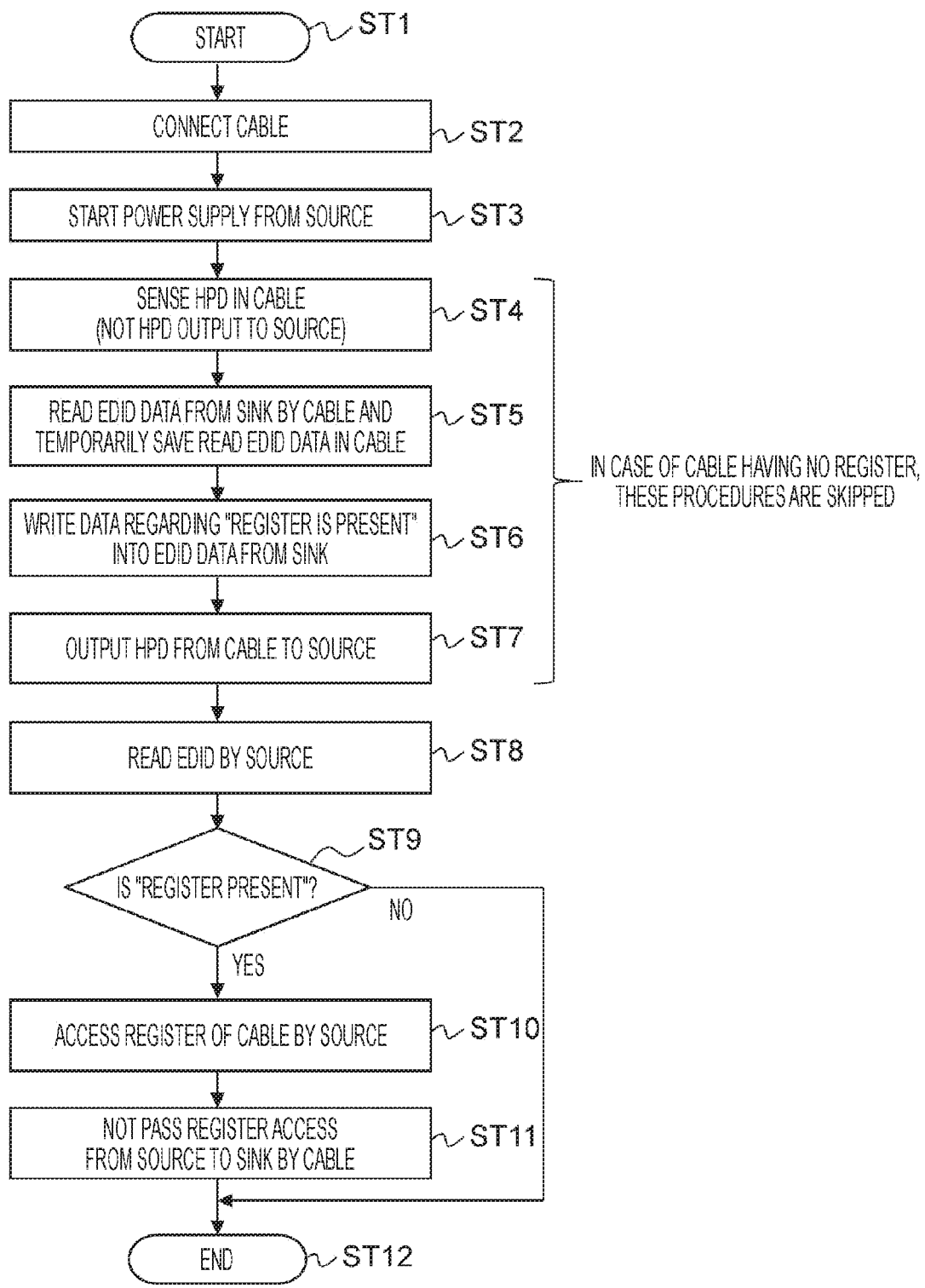
FIG. 10 is a flowchart for describing a series of operations when a cable in a transmission system is connected.

The flowchart in FIG. 10 illustrates the series of operations when the cable in the transmission systems 10-1 in FIG. 7 or the cable in the transmission system 10-1A in FIG. 9 is connected. In step ST1, the series of operations starts. Next, when the cable 130 is connected between the source apparatus 110 and the sink apparatus 320 in step ST2, supply of power from the source apparatus 110 through the power line 341 starts in step ST3.

Next, in step ST4, the buffer unit 132 of the cable 130 obtains the connection sensed signal (HPD signal) from the HPD line 343. At this time, the connection sensed signal is not transferred to the source apparatus 110. Then, in step ST5, the buffer unit 132 of the cable 130 reads EDID from the EDID ROM 321 of the sink apparatus 320 and temporarily saves the read EDID in the register 133 in the buffer unit 132.

Next, in step ST6, the buffer unit 132 adds, to the EDID, information indicating that the register is retained in the cable, and rewrites the EDID. Thereafter, in step ST7, the buffer unit 132 of the cable 130 outputs a connection sensed signal to the source apparatus 110 through the HPD line 343.

Next, in step ST8, the source apparatus 110 reads the EDID through the DDC line 342. Next, in step ST9, the source apparatus 110 determines whether or not the cable retains the register from the read EDID. When the information indicating that the cable retains the register is present in the EDID, the source apparatus 110 accesses the register 131 of the cable and acquires the details of retaining in step ST10.

In addition, at this time, in step ST11, the buffer unit 132 of the cable 130 performs control such that the access information from the source apparatus 110 to the register 131 is not passed to the sink apparatus 320. After step ST11, in step ST12, the series of operations ends. In contrast, in step ST9, when no information indicating that a register is retained in the cable is present in the EDID, the series of operations ends immediately in step ST12. Note that, in a case of a cable with no register 131 retained, the procedures in steps ST4 to ST7 are skipped.

Second Embodiment

Figure 11:
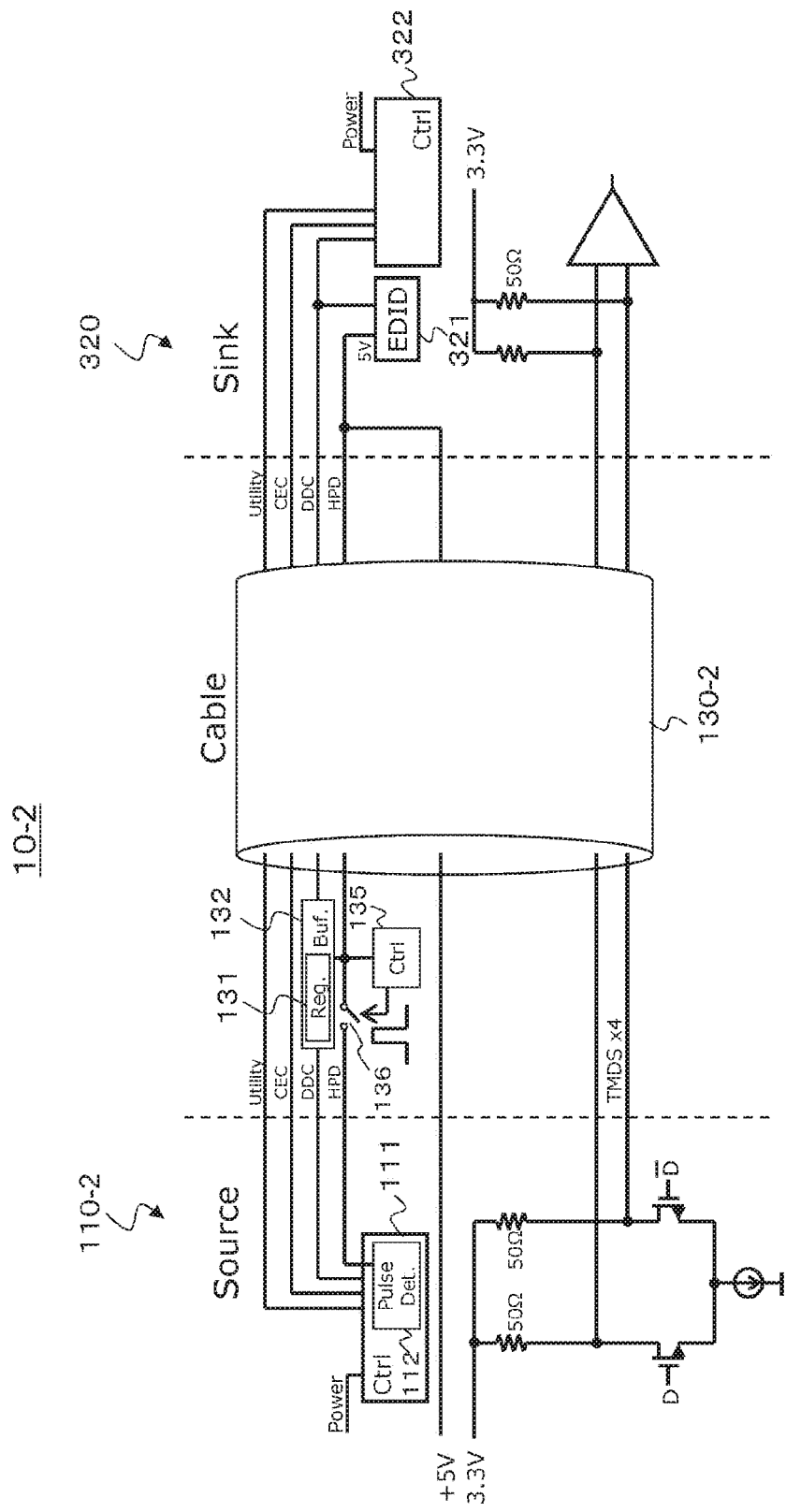
FIG. 11 illustrates an exemplary configuration of a transmission system as a second embodiment.

FIG. 11 illustrates an exemplary configuration of a transmission system 10-2 as a second embodiment. This exemplary configuration is an example in which a cable issues notification, to the source apparatus, that the cable has a register with the cable specification data stored.

The transmission system 10-2 is an HDMI transmission system with HDMI as a digital interface. The transmission system 10-2 includes a source apparatus 110-2 serving as a transmission apparatus, a sink apparatus 320 serving as a reception apparatus, and an HDMI cable 130-2 that makes connection between the source apparatus 110-2 and the sink apparatus 320. In FIG. 11, parts corresponding to those in FIG. 8 are denoted by the same reference signs, and detailed description of the corresponding parts will be omitted.

In the cable 130-2, a buffer unit 132 is disposed in the DDC line. The buffer unit 132 includes a register 131 having stored the specification data of the cable 130 (also including characteristic data of the cable 130) and the like. In addition, the buffer unit 132 does not pass access information from a control unit 111 of the source apparatus 110-2 to the register 131, to the sink apparatus 320.

Furthermore, the cable 130-2 has a control unit (control block) 135, and a switch 136 for generating pulse information provided in an HPD line. Note that the buffer unit 132 and the control unit 135 are supplied with power from the HPD line.

Furthermore, the source apparatus 110-2 includes a pulse detection unit 112 that detects pulse information in a case where the pulse information has been provided on the HPD line. When the pulse information is detected by the pulse detection unit 112, the source apparatus 110-2 determines that the cable 130-2 retains the register 131 in a case of a predetermined pulse.

The control unit 135 of the cable 130-2 controls such that the switch 136 is turned off (is opened) at the initial state or when a connection sensed signal (HPD signal) from the sink apparatus 320 is at "Low (0)", and turned on (is closed)/turned off (is opened) alternately when the connection sensed signal ("HPD signal") switches to "High (1)", whereby the control unit 135 transmits pulse information of "High"/"Low" to the source apparatus 110-2 side through the HPD line.

At this time, in the cable 130-2, providing pull down resistance on the source apparatus 110-2 side with respect to the switch 136 enables transmission of "High" information when the switch 136 is on and "Low" information when the switch is off, to the source apparatus 110-2 side. When receiving predetermined pulse information, the source apparatus 110-2 determines that the cable 130-2 has the register 131, and enables access to a new address.

In this case, the pulse may be a monotone pulse, or may be a data string. Alternatively, a constant number of pulses may be repeatedly sent such that the source apparatus 110-2 can receive the pulse information reliably. After transmitting the pulse information to the source apparatus 110-2 side, the control unit 135 of the cable 130-2 turns on (closes) the switch 136, thereby enabling shift to a normal sequence. At this time, if the source apparatus 110-2 cannot sense pulse information from a linked cable, it can be determined that the cable has no new address or the cable is a legacy cable.

In the transmission system 10-2 illustrated in FIG. 11, the source apparatus 110-2 accesses the register 131 when it is sensed that the register 131 is present in the cable 130-2. Therefore, register access is not performed for a cable having no register, and transmission of access information to a sink apparatus via the cable can be suppressed, so that malfunction can be prevented from occurring in the sink apparatus in which the corresponding address is not defined.

In addition, in the transmission system 10-2 illustrated in FIG. 11, the cable 130-2 provides information indicating the presence of the register 131, to the source apparatus 110-2. Therefore, it is recognized that the cable 130-2 retains the register 131, and access to the register 131 can be performed to acquire storage data, in the source apparatus 110-2. Furthermore, when access is made from the source apparatus 110-2 to the register 131, the cable 130-2 blocks the access information at the buffer unit 132 such that the access information is not sent to the sink apparatus 320. Therefore, transmission of the access information to a sink apparatus can be suppressed, so that malfunction can be prevented from occurring in the sink apparatus in which the corresponding address is not defined.

Third Embodiment

Figure 12:
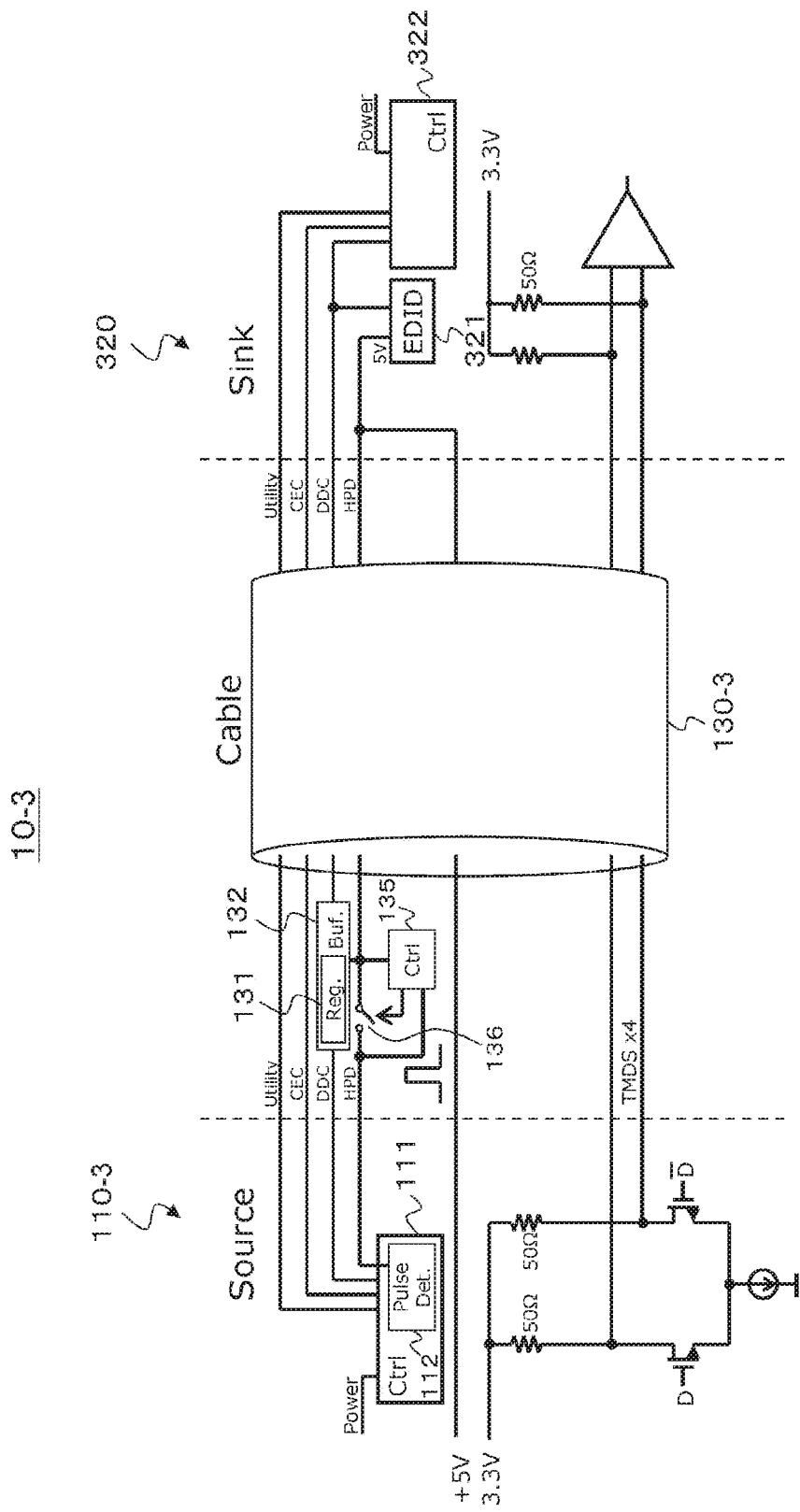
FIG. 12 illustrates an exemplary configuration of a transmission system as a third embodiment.

FIG. 12 illustrates an exemplary configuration of a transmission system 10-3 as a third embodiment. This exemplary configuration is also an example in which a cable issues notification, to the source apparatus, that the cable has a register with the cable specification data stored.

The transmission system 10-3 is an HDMI transmission system with HDMI as a digital interface. The transmission system 10-3 includes a source apparatus 110-3 serving as a transmission apparatus, a sink apparatus 320 serving as a reception apparatus, and an HDMI cable 130-3 that makes connection between the source apparatus 110-3 and the sink apparatus 320. In FIG. 12, parts corresponding to those in FIG. 11 are denoted by the same reference signs, and detailed description of the corresponding parts will be omitted. In the transmission system 10-3, pulse information is suppliable from a control unit 135 to portions of the source apparatus 110-3 side with respect to a switch 136, on an HPD line.

When a connection sensed signal (HPD signal) from the sink apparatus 320 switches to "High (1)", the control unit 135 in the cable 130-3 directly transmits the pulse information to the source apparatus 110-3 through the HPD line with the switch 136 kept off. After completing the transmission of the pulse information, the control unit 135 switches the switch 136 to on, and shifts to normal operation.

In this case, if the end of a pulse is fixed to "High", "High" information can be transmitted to the source apparatus 110-3, as a connection sensed signal (HPD signal) even until the switch 136 is turned on (closed) after the completion of pulse, thereby enabling shift to normal sequence mode sooner than the switch 136 is closed.

At this time, when the switch 136 is turned on (closed), it is likely that 5 V of the connection sensed signal (HPD signal) from the sink apparatus 320 conflicts with 5 V output from the control unit 135 of the cable 130-3. However, the confliction is avoidable by turning off the switch 136 and simultaneously releasing the fixation at "High" having been output from the control unit 135 to change to high impedance output.

As described above, the pulse information is directly transmitted from the control unit 135 in the cable 130-3 to the source apparatus 110-3 with the switch 136 kept off, thereby enabling elimination of feedback noise to the sink apparatus 320 when the pulse information is generated by directly turning on/off the switch 136 installed in the HPD line.

Fourth Embodiment

Figure 13:
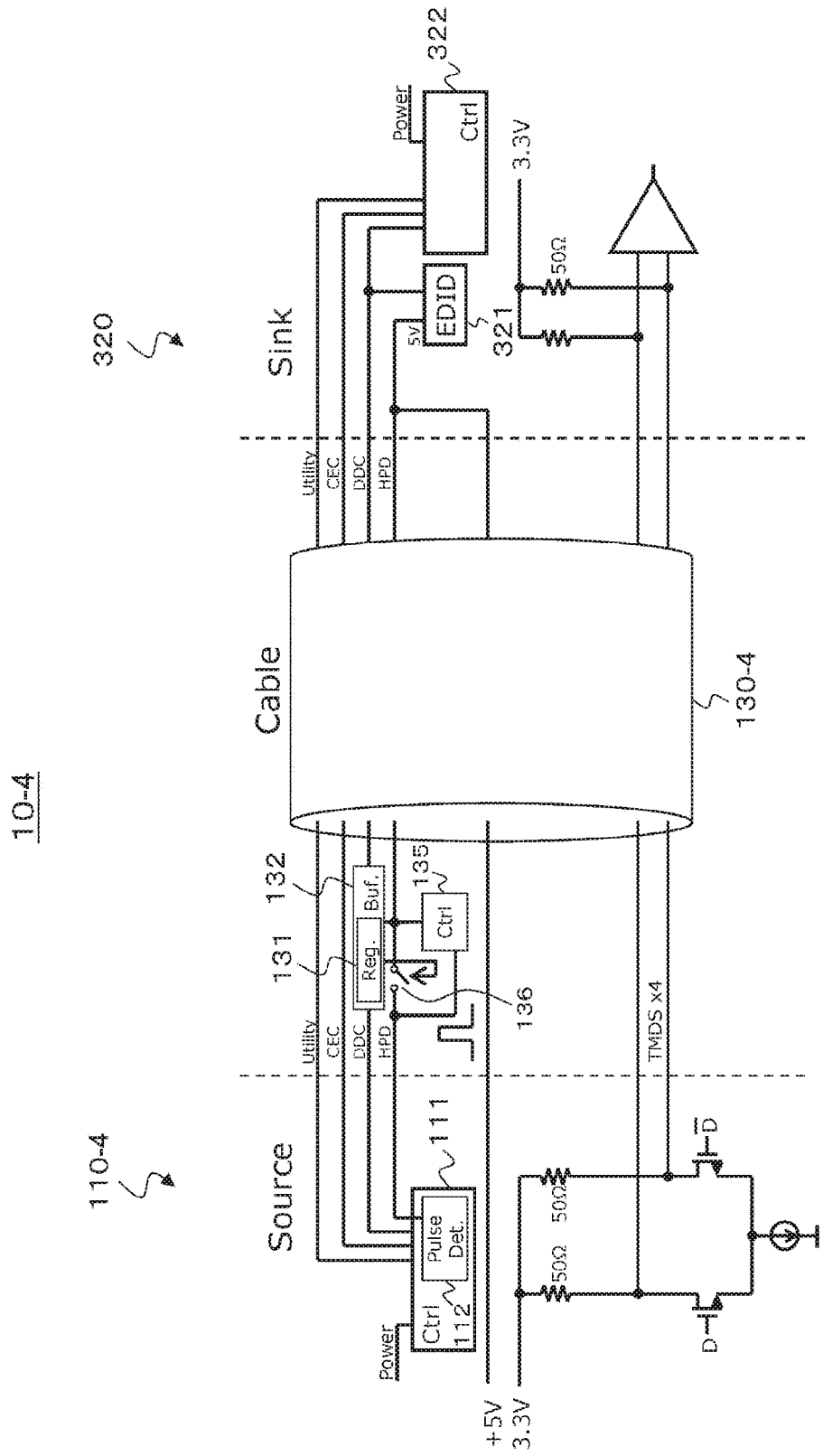
FIG. 13 illustrates an exemplary configuration of a transmission system as a fourth embodiment.

FIG. 13 illustrates an exemplary configuration of a transmission system 10-4 as a fourth embodiment. This exemplary configuration is also an example in which a cable issues notification, to the source apparatus, that the cable has a register with the cable specification data stored.

The transmission system 10-4 includes a source apparatus 110-4 serving as a transmission apparatus, a sink apparatus 320 serving as a reception apparatus, and an HDMI cable 130-4 that makes connection between the source apparatus 110-4 and the sink apparatus 320. In FIG. 13, parts corresponding to those in FIG. 12 are denoted by the same reference signs, and detailed description of the corresponding parts will be omitted.

In the transmission system 10-4, in a case where, after a source apparatus 110-2 recognizes the presence of a register 131 in the cable 130-4, the recognition has been reported from the source apparatus 110-2 to the cable 130-4, a switch 136 of an HPD line is turned on/off with the recognition signal. Such an arrangement enables reporting again to the source apparatus 110-4 that the cable 130-4 has correctly received the recognition signal, or enables retransmission of pulse information to further perform different communication.

Fifth Embodiment

Figure 14:
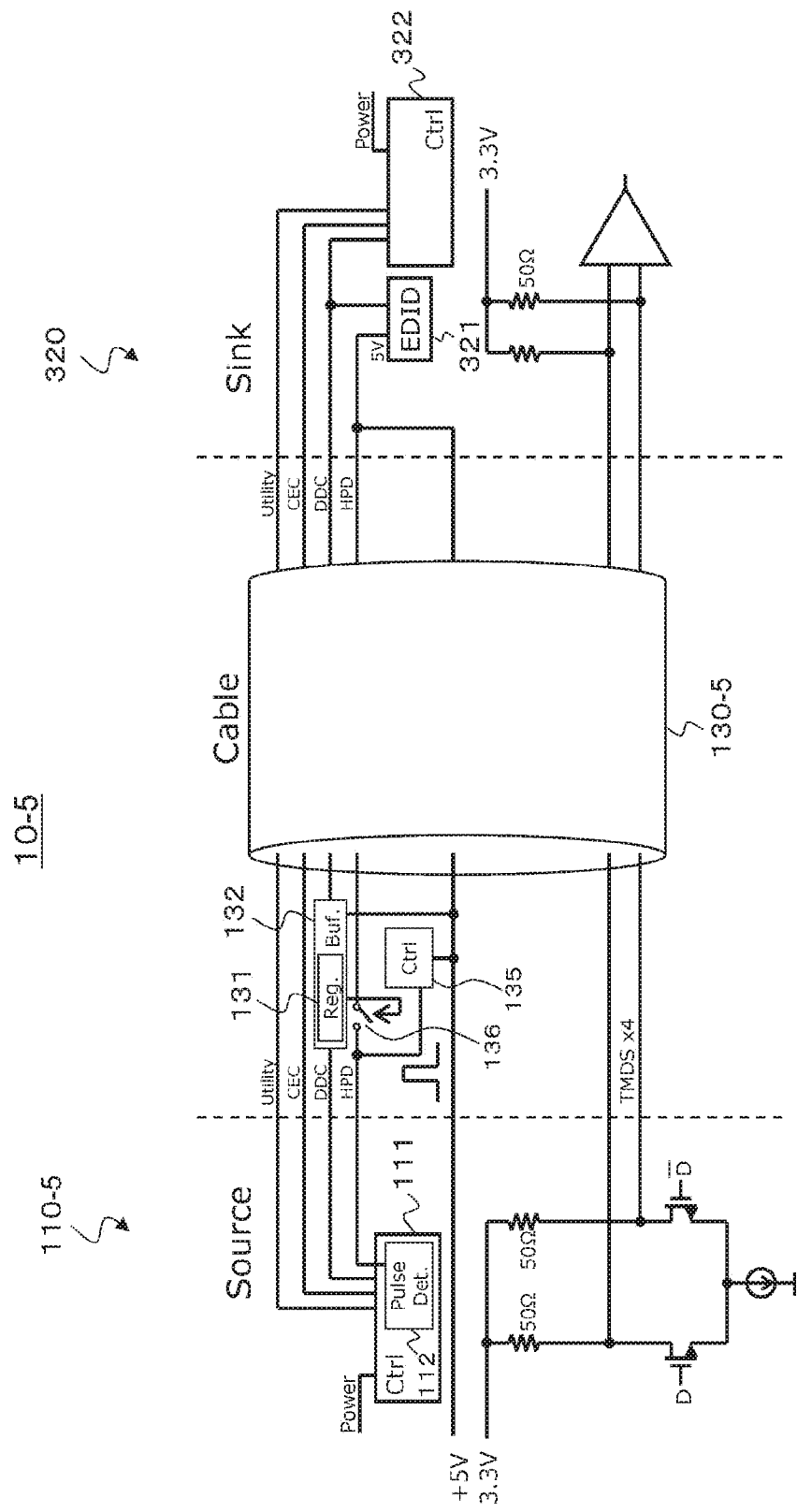
FIG. 14 illustrates an exemplary configuration of a transmission system as a fifth embodiment.

FIG. 14 illustrates an exemplary configuration of a transmission system 10-5 as a fifth embodiment. This exemplary configuration is also an example in which a cable issues notification, to the source apparatus, that the cable has a register with the cable specification data stored.

The transmission system 10-5 includes a source apparatus 110-5 serving as a transmission apparatus, a sink apparatus 320 serving as a reception apparatus, and an HDMI cable 130-5 that makes connection between the source apparatus 110-5 and the sink apparatus 320. In FIG. 14, parts corresponding to those in FIG. 13 are denoted by the same reference signs, and detailed description of the corresponding parts will be omitted.

For the transmission system cable 130-4 illustrated in FIG. 13 or the like, the example indicates that the power supplied to a control unit 135 and a buffer unit 132 in the cable 130-5 is obtained from the HPD line, whereas for the transmission system 10-5, the example indicates that power is obtained from a +5-V power line.

Sixth Embodiment

Figure 15:
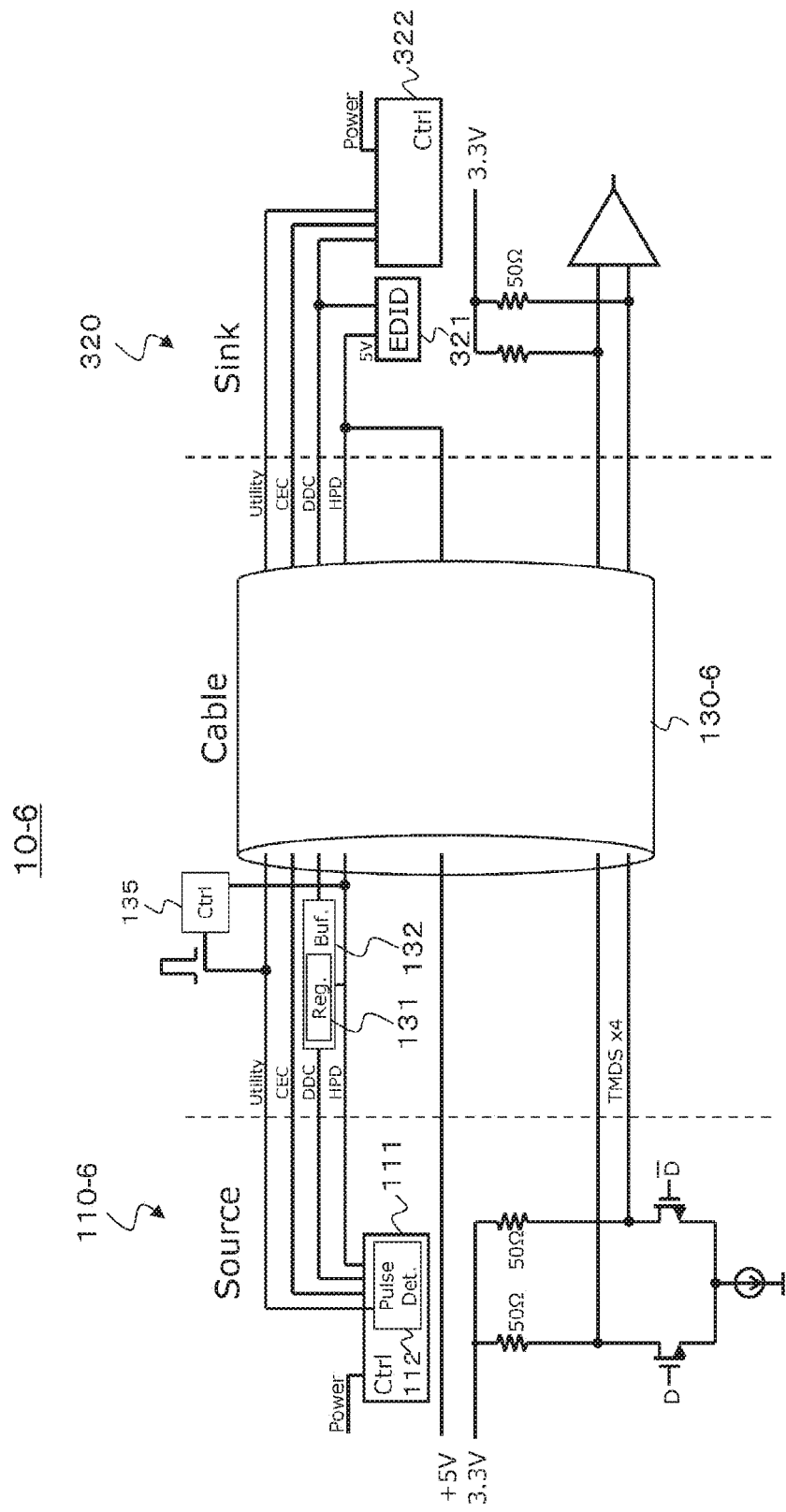
FIG. 15 illustrates an exemplary configuration of a transmission system as a sixth embodiment.

FIG. 15 illustrates an exemplary configuration of a transmission system 10-6 as a sixth embodiment. This exemplary configuration is also an example in which a cable issues notification, to the source apparatus, that the cable has a register with the cable specification data stored.

The transmission system 10-6 includes a source apparatus 110-6 serving as a transmission apparatus, a sink apparatus 320 serving as a reception apparatus, and an HDMI cable 130-6 that makes connection between the source apparatus 110-6 and the sink apparatus 320. In FIG. 15, parts corresponding to those in FIG. 11 are denoted by the same reference signs, and detailed description of the corresponding parts will be omitted.

This exemplary configuration is an example in which pulse information is transmitted from the cable 130-6 to the source apparatus 110-6 without using a switch of an HPD line. For example, as illustrated in the figure, a method is conceivable in which a Utility line prescribed by HDMI is used to transmit pulse information.

When sensing "High" information regarding a connection sensed signal (HPD signal), a control unit 135 in the cable 130-6 provides pulse information on the Utility line to transfer the pulse information to the source apparatus 110-6.

Seventh Embodiment

Figure 16:
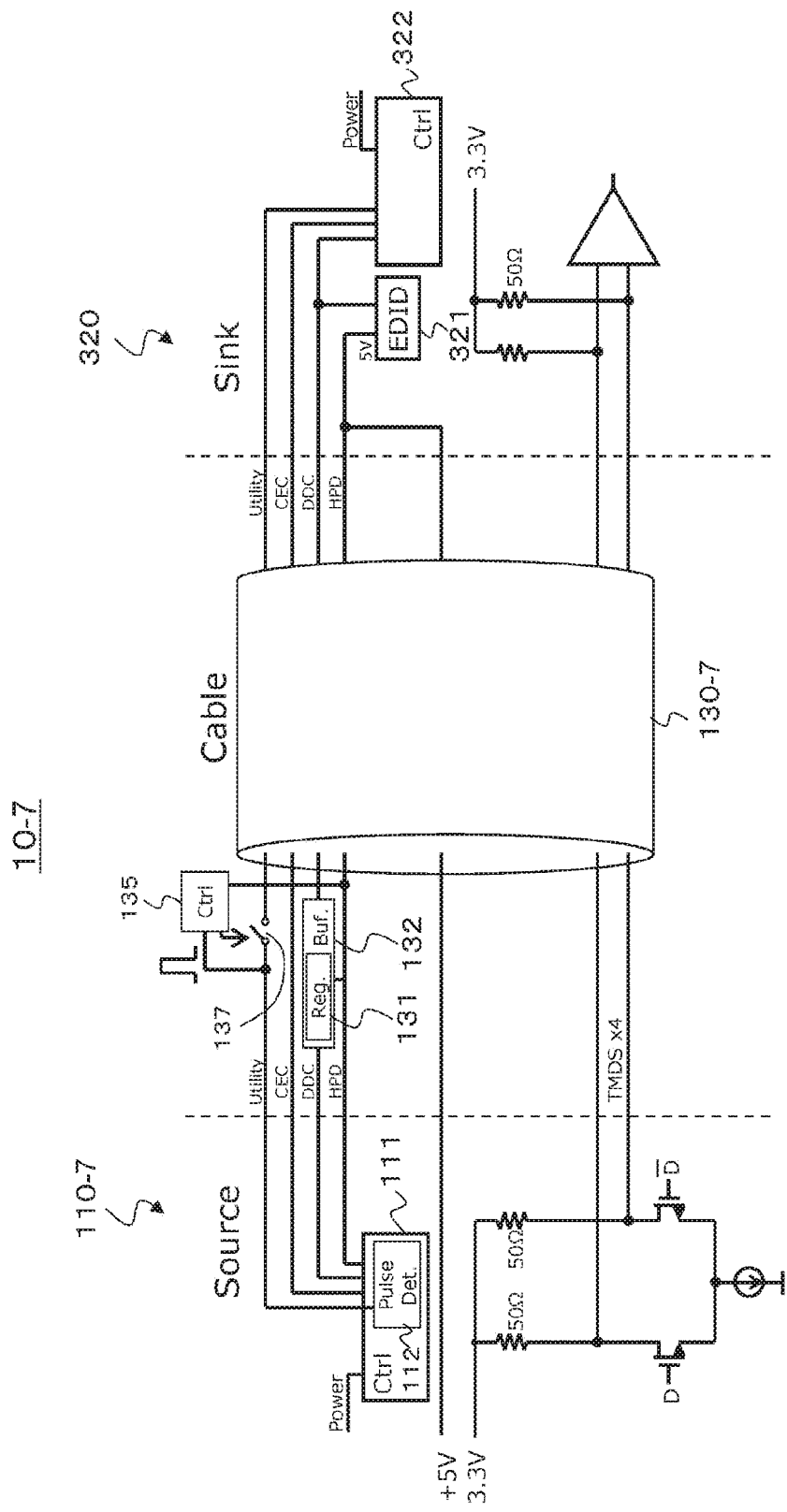
FIG. 16 illustrates an exemplary configuration of a transmission system as a seventh embodiment.

FIG. 16 illustrates an exemplary configuration of a transmission system 10-7 as a seventh embodiment. This exemplary configuration is also an example in which a cable issues notification, to the source apparatus, that the cable has a register with the cable specification data stored.

The transmission system 10-7 includes a source apparatus 110-7 serving as a transmission apparatus, a sink apparatus 320 serving as a reception apparatus, and an HDMI cable 130-7 that makes connection between the transmission apparatus 110-7 and the sink apparatus 320. In FIG. 16, parts corresponding to those in FIG. 15 are denoted by the same reference signs, and detailed description of the corresponding parts will be omitted.

This exemplary configuration is an example in which a switch 137 is provided in a Utility line in order to avoid transmission of pulse information to the sink apparatus 320 through the Utility line. A control unit 135 can avoid the transmission by turning off the switch 137 during transmission of pulse information and turning on (closing) the switch 137 after completion of the transmission.

Eighth Embodiment

Figure 17:
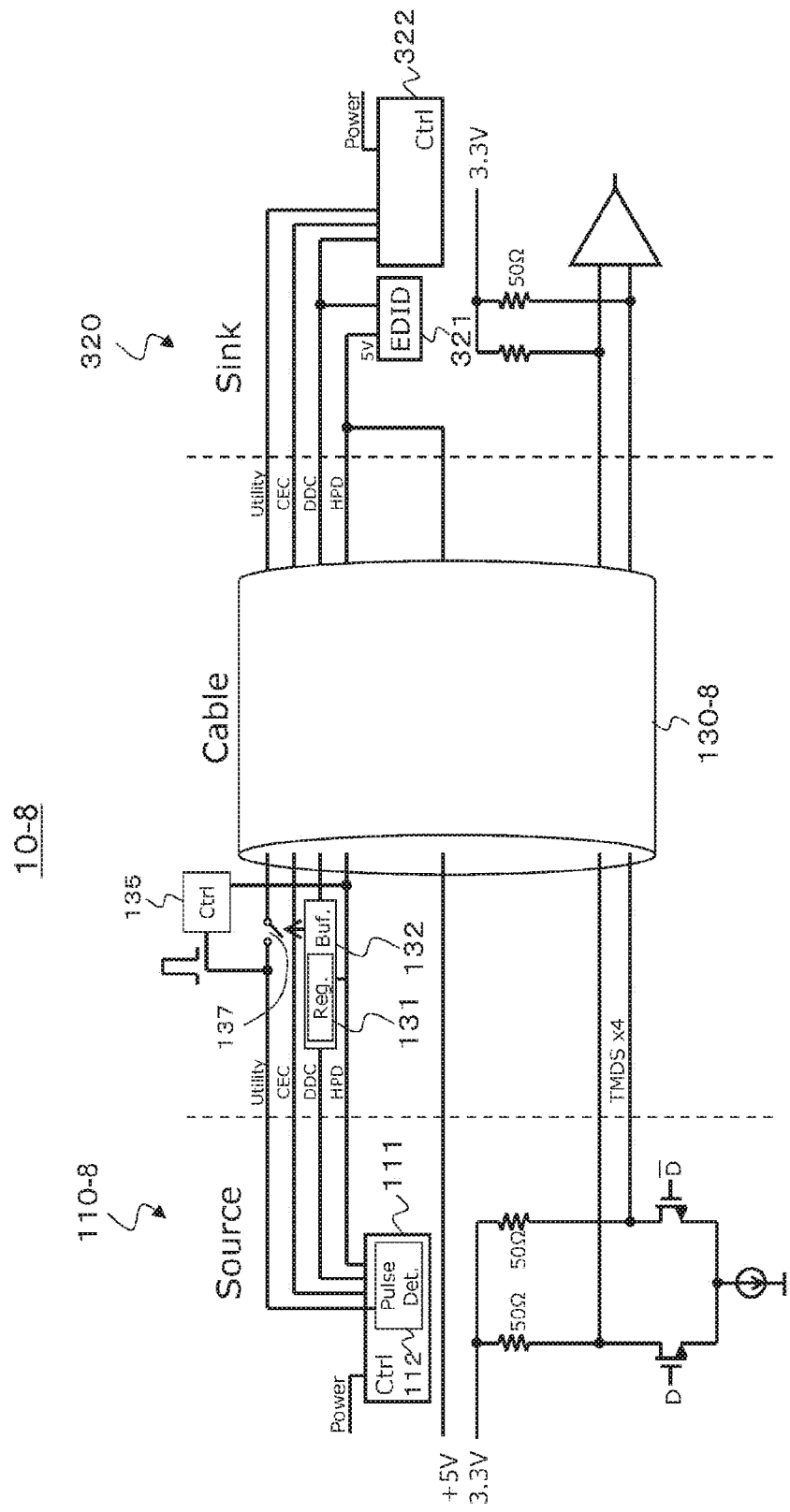
FIG. 17 illustrates an exemplary configuration of a transmission system as an eighth embodiment.

FIG. 17 illustrates an exemplary configuration of a transmission system 10-8 as an eighth embodiment. This exemplary configuration is also an example in which a cable issues notification, to the source apparatus, that the cable has a register with the cable specification data stored.

The transmission system 10-8 includes a source apparatus 110-8 serving as a transmission apparatus, a sink apparatus 320 serving as a reception apparatus, and an HDMI cable 130-8 that makes connection between the source apparatus 110-8 and the sink apparatus 320. In FIG. 17, parts corresponding to those in FIG. 16 are denoted by the same reference signs, and detailed description of the corresponding parts will be omitted.

In this exemplary configuration, as a way of closing a switch 137, after sensing pulse information, the source apparatus 110-8 may issue notification, to the cable 130-8, that the pulse information has been sensed, and then the switch 137 in the cable 130-8 may be closed.

Ninth Embodiment

Figure 18:
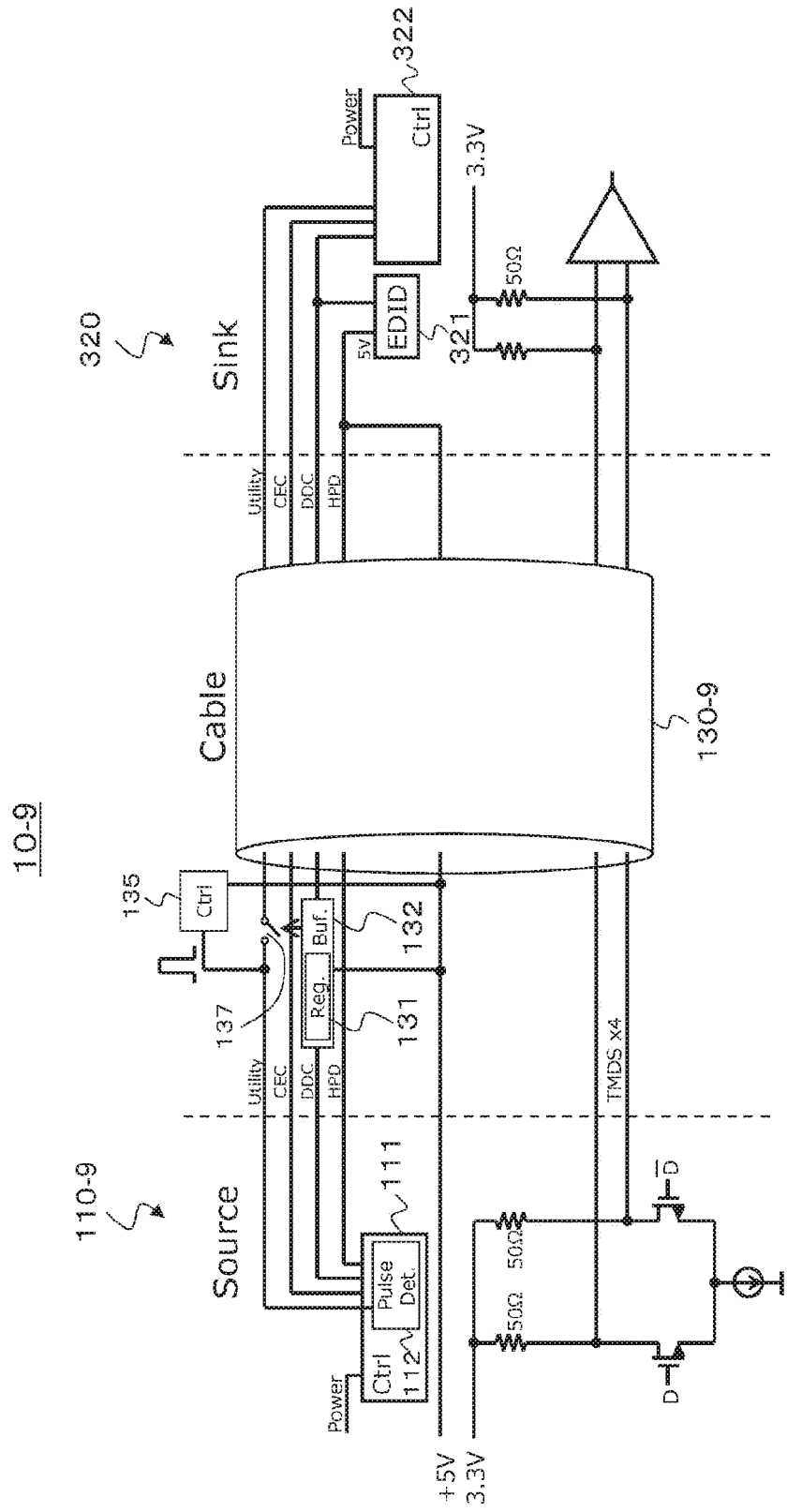
FIG. 18 illustrates an exemplary configuration of a transmission system as a ninth embodiment.

FIG. 18 illustrates an exemplary configuration of a transmission system 10-9 as a ninth embodiment. This exemplary configuration is also an example in which a cable issues notification, to the source apparatus, that the cable has a register with the cable specification data stored.

The transmission system 10-9 includes a source apparatus 110-9 serving as a transmission apparatus, a sink apparatus 320 serving as a reception apparatus, and an HDMI cable 130-9 that makes connection between the source apparatus 110-9 and the sink apparatus 320. In FIG. 18, parts corresponding to those in FIG. 17 are denoted by the same reference signs, and detailed description of the corresponding parts will be omitted.

For the transmission system cable 130-8 illustrated in FIG. 17 or the like, the example indicates that the power supplied to a control unit 135 and a buffer unit 132 in the cable 130-8 is obtained from the HPD line, whereas for the transmission system 10-9, the example indicates that power is obtained from a +5-V power line. In this case, in the transmission system cable 130-8 illustrated in FIG. 17 or the like, sensing of "High" of the connection sensed signal (HPD signal) is used as a trigger to start operation; however, in the transmission system 10-9, sensing of "High" on the +5-V power line may be used as a trigger.

Tenth Embodiment

Figure 19:
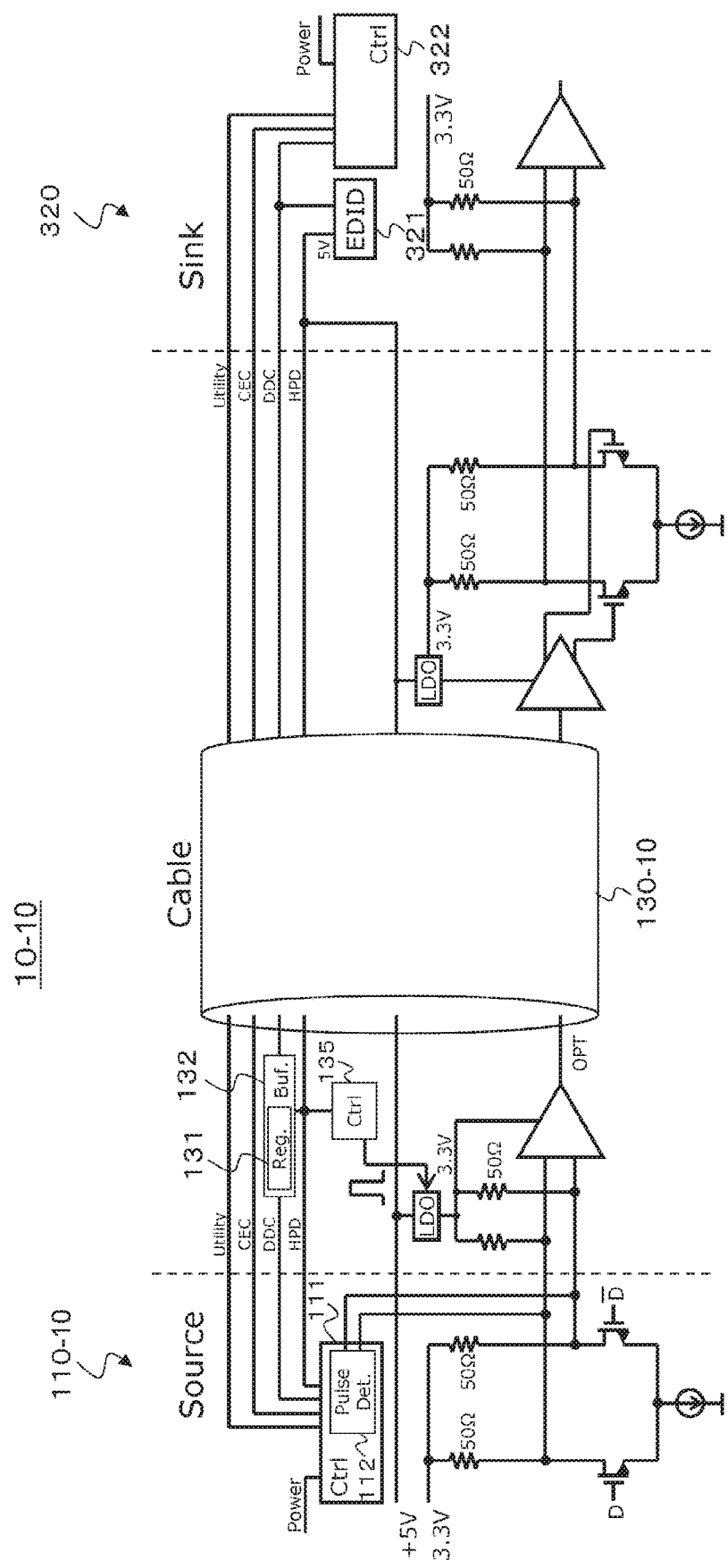
FIG. 19 illustrates an exemplary configuration of a transmission system as a tenth embodiment.

FIG. 19 illustrates an exemplary configuration of a transmission system 10-10 as a tenth embodiment. This exemplary configuration is also an example in which a cable issues notification, to the source apparatus, that the cable has a register with the cable specification data stored.

The transmission system 10-10 includes a source apparatus 110-10 serving as a transmission apparatus, a sink apparatus 320 serving as a reception apparatus, and an HDMI cable 130-10 that makes connection between the source apparatus 110-10 and the sink apparatus 320. In FIG. 19, parts corresponding to those in FIG. 11 are given the same reference signs, and detailed description of the corresponding parts will be omitted.

In this exemplary configuration, an active circuit for adjusting the characteristics of TMDS lines is built in the cable 130-10. For example, this is a case of an active cable such as an active optical cable (AOC). In this case, after sensing "High" information regarding a connection sensed signal (HPD signal), the control unit 135 in the cable 130-10 turns on/off a low dropout (LDO) in a plug on the source apparatus 110-10 side to be able to control LDO output voltage, so that pulse information regarding "High"/"Low" can be transmitted to the source apparatus 110-10 side through the TMDS lines. In the source apparatus 110-10, the voltage of the TMDS lines is monitored, so that the pulse information can be sensed. At this time, if the LDO is turned on after transmission of the pulse information, the TMDS lines can operate normally.

Eleventh Embodiment

Figure 20:
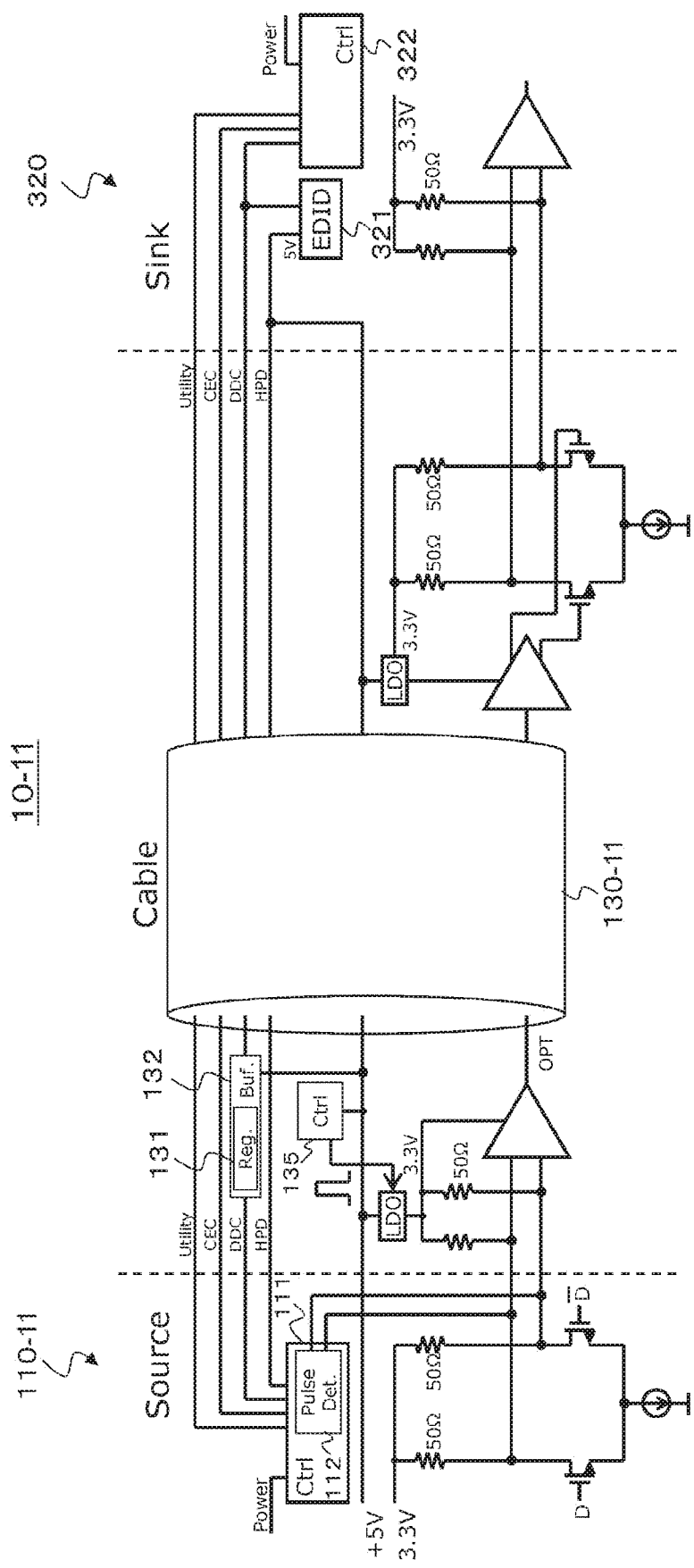
FIG. 20 illustrates an exemplary configuration of a transmission system as an eleventh embodiment.

FIG. 20 illustrates an exemplary configuration of a transmission system 10-11 as an eleventh embodiment. This exemplary configuration is also an example in which a cable issues notification, to the source apparatus, that the cable has a register with the cable specification data stored.

The transmission system 10-11 includes a source apparatus 110-11 serving as a transmission apparatus, a sink apparatus 320 serving as a reception apparatus, and an HDMI cable 130-11 that makes connection between the source apparatus 110-11 and the sink apparatus 320. In FIG. 20, parts corresponding to those in FIG. 19 are denoted by the same reference signs, and detailed description of the corresponding parts will be omitted.

For the transmission system cable 130-10 illustrated in FIG. 19 or the like, the example indicates that the power supplied to a control unit 135 and a buffer unit 132 in the cable 130-11 is obtained from the HPD line, whereas for the transmission system 10-11, the example indicates that power is obtained from a +5-V power line. In this case, in the transmission system cable 130-10 illustrated in FIG. 19 or the like, sensing of "High" of the connection sensed signal (HPD signal) is used as a trigger to start operation; however, in the transmission system 10-11, sensing of "High" on the +5-V power line may be used as a trigger.

Twelfth Embodiment

Figure 21:
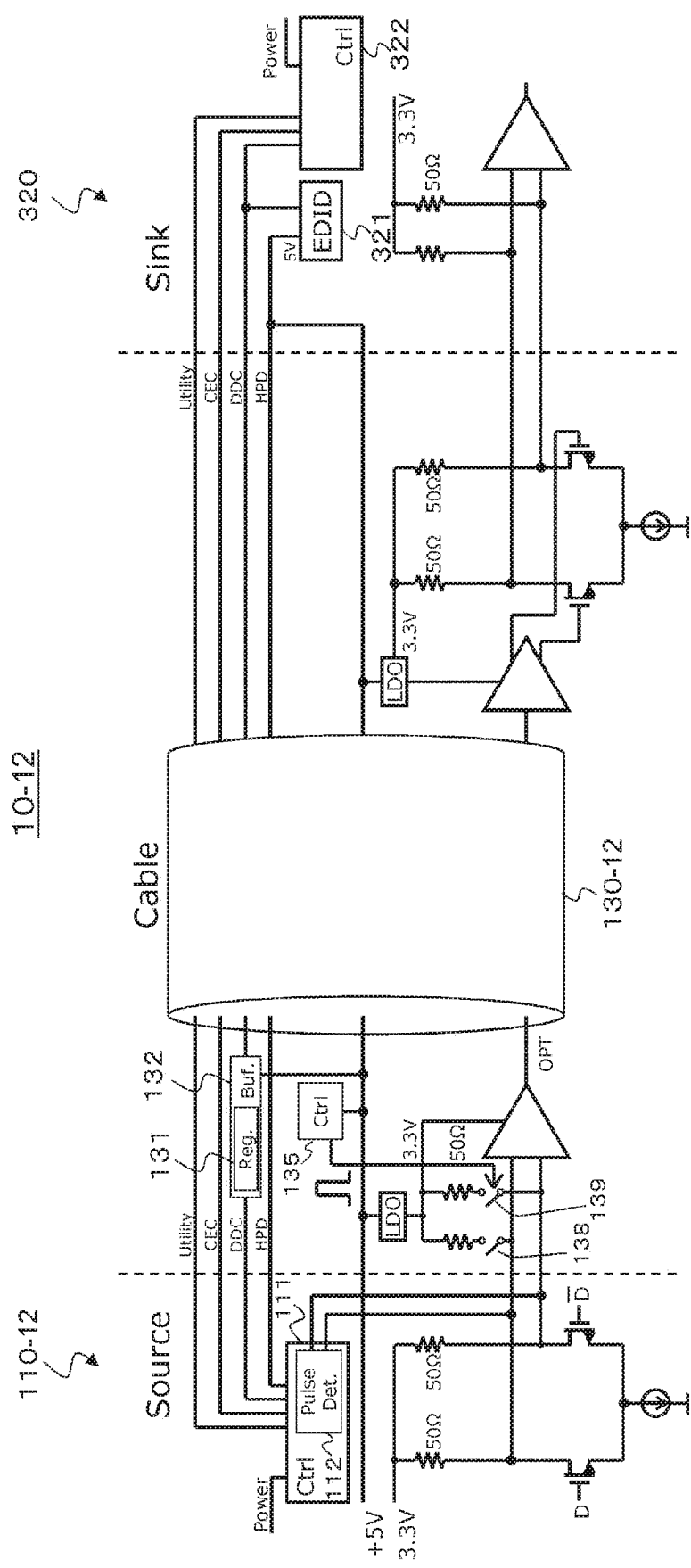
FIG. 21 illustrates an exemplary configuration of a transmission system as a twelfth embodiment.

FIG. 21 illustrates an exemplary configuration of a transmission system 10-12 as a twelfth embodiment. This exemplary configuration is also an example in which a cable issues notification, to the source apparatus, that the cable has a register with the cable specification data stored.

The transmission system 10-12 includes a source apparatus 110-12 serving as a transmission apparatus, a sink apparatus 320 serving as a reception apparatus, and an HDMI cable 130-12 that makes connection between the source apparatus 110-12 and the sink apparatus 320. In FIG. 21, parts corresponding to those in FIG. 20 are denoted by the same reference signs, and detailed description of the corresponding parts will be omitted.

In the transmission system 10-11 illustrated in FIG. 20 described above, the pulse information is reported to the source apparatus 110-12 by turning off/on the LDO, whereas the transmission system 10-12 has switches 138 and 139 provided in the lines linked to the termination resistor of the TMDS lines, and pulse information is reported to the source apparatus 110-12 by turning off/on the switches 138 and 139.

Here, a method of transferring a connection sensed signal (HPD signal) to a source apparatus, in order to shift to normal sequence after negotiation between a source apparatus and a cable that the cable has a register 131 therein will be described.

In the case of the configuration of FIG. 11, it is sufficient if the switch 136 is turned off after transmission of the pulse information, the fact that the pulse information has been sensed from the source apparatus 110-2 is transmitted to the cable 130-2 through, for example, the DDC line, and the cable 130-2 closes the switch 136 thereafter. In addition, in the case of the configuration of FIG. 12, it is sufficient if the cable 130-4 fixes the end of a pulse signal to Low and closes the switch 136 after sensing a feedback signal from the source apparatus 110-3. In the case of the configuration of FIG. 13, it is sufficient if the cable 130-5 fixes the end of a pulse signal to Low and closes the switch 136 after sensing a feedback signal from the source apparatus 110-4.

Figure 22:
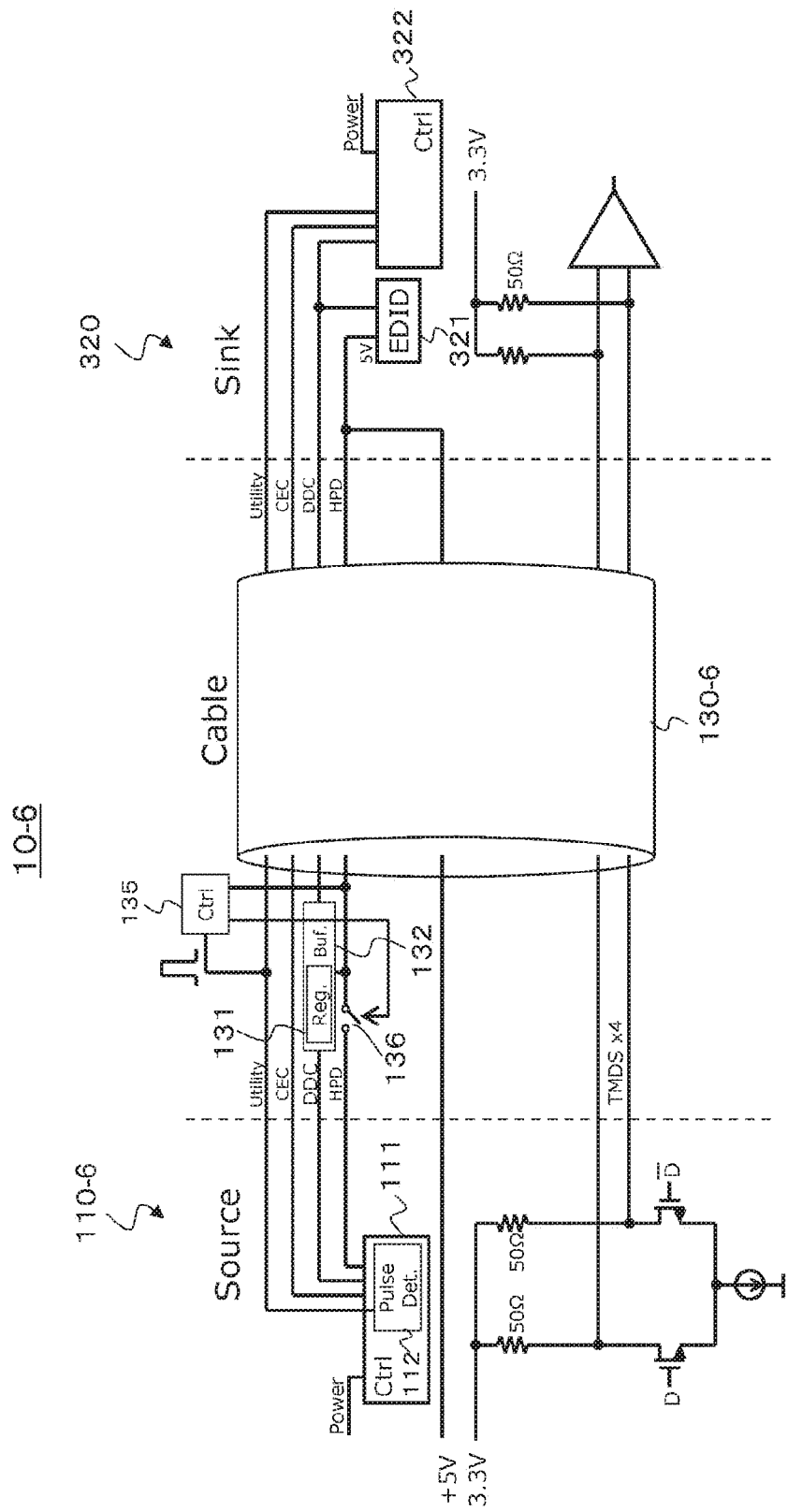
FIG. 22 explanatorily illustrates a method of transferring a connection sensed signal (hot plug detect (HPD) signal) to a source apparatus in order to shift to a normal sequence.
Figure 23:
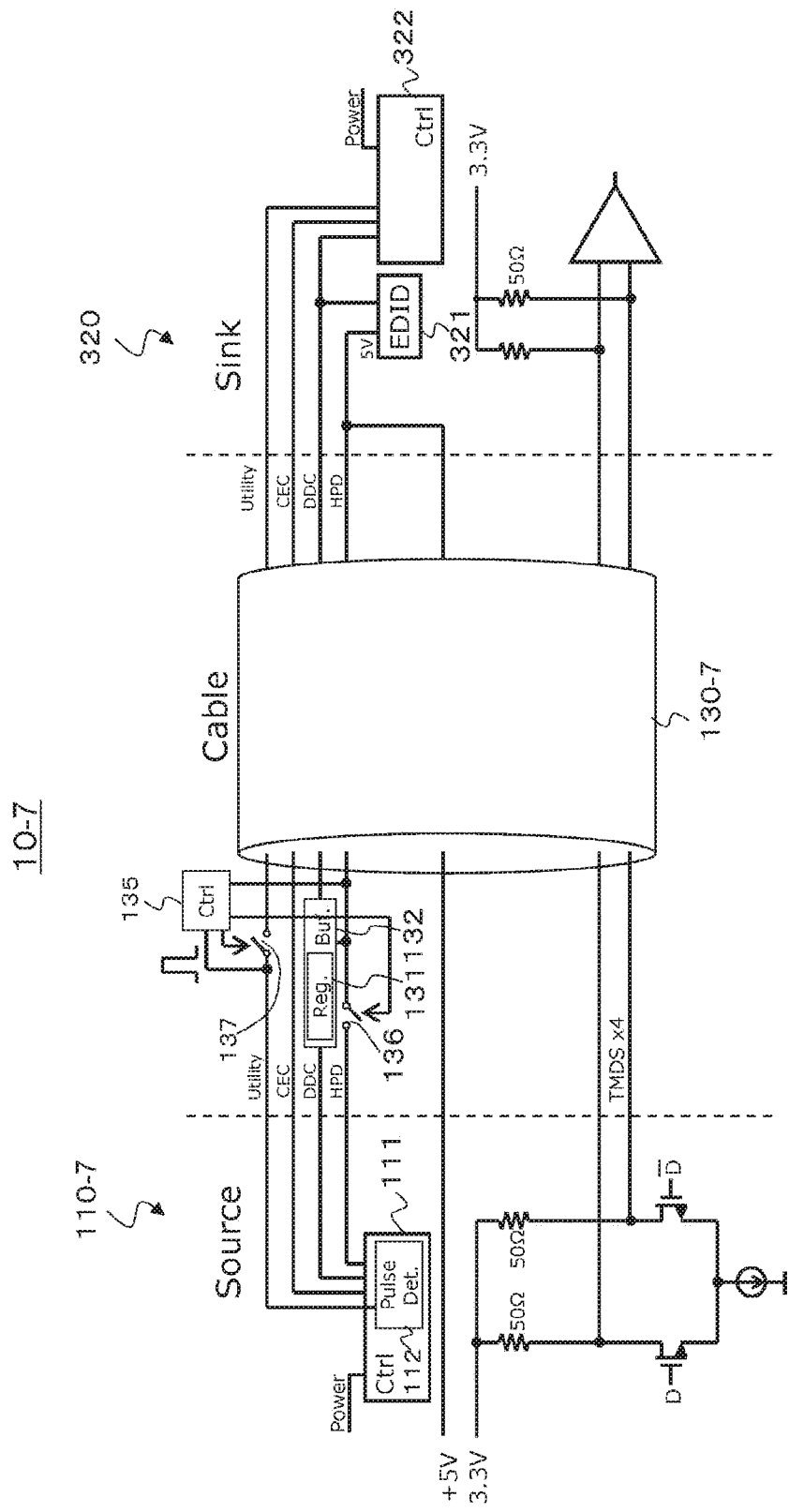
FIG. 23 explanatorily illustrates a method of transferring a connection sensed signal (HPD signal) to a source apparatus in order to shift to a normal sequence.
Figure 24:
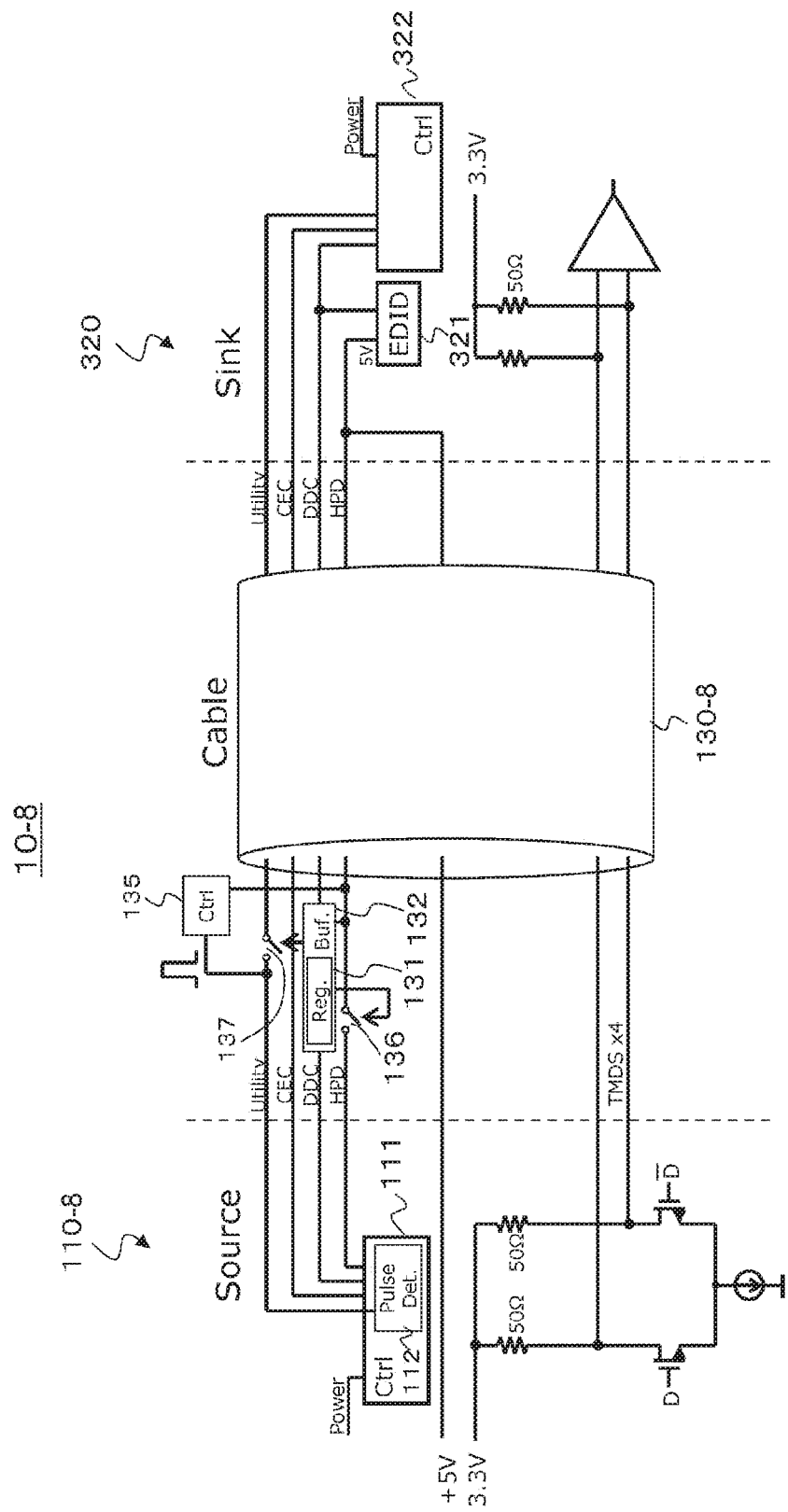
FIG. 24 explanatorily illustrates a method of transferring a connection sensed signal (HPD signal) to a source apparatus in order to shift to a normal sequence.

Furthermore, as illustrated in FIGS. 15 to 18, for example, even in the case where the Utility line is used, it is sufficient if a switch 136 is provided in an HPD line and the switch 136 is closed with a feedback signal from a source apparatus as a trigger, as illustrated in FIGS. 22 to 24.

Figure 25:
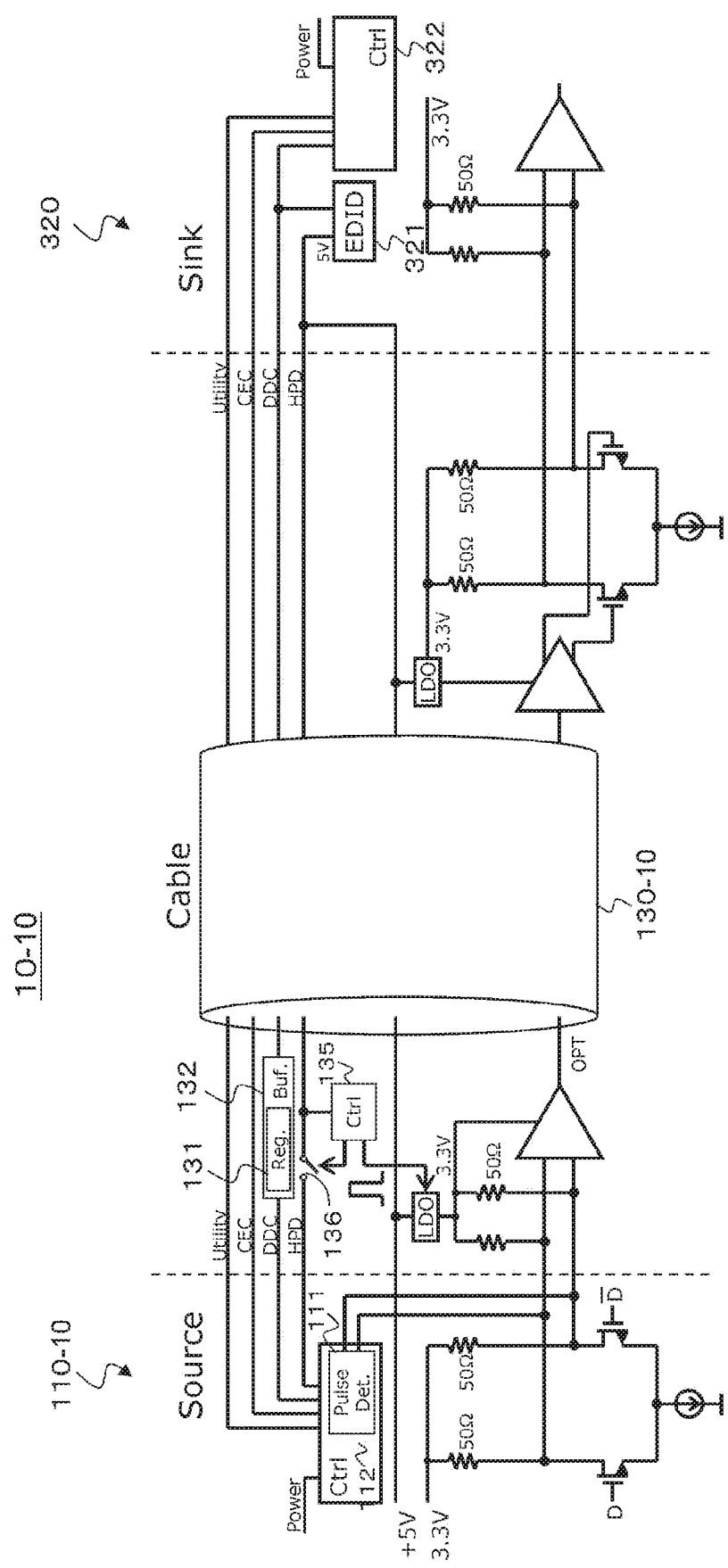
FIG. 25 explanatorily illustrates a method of transferring a connection sensed signal (HPD signal) to a source apparatus in order to shift to a normal sequence.
Figure 26:
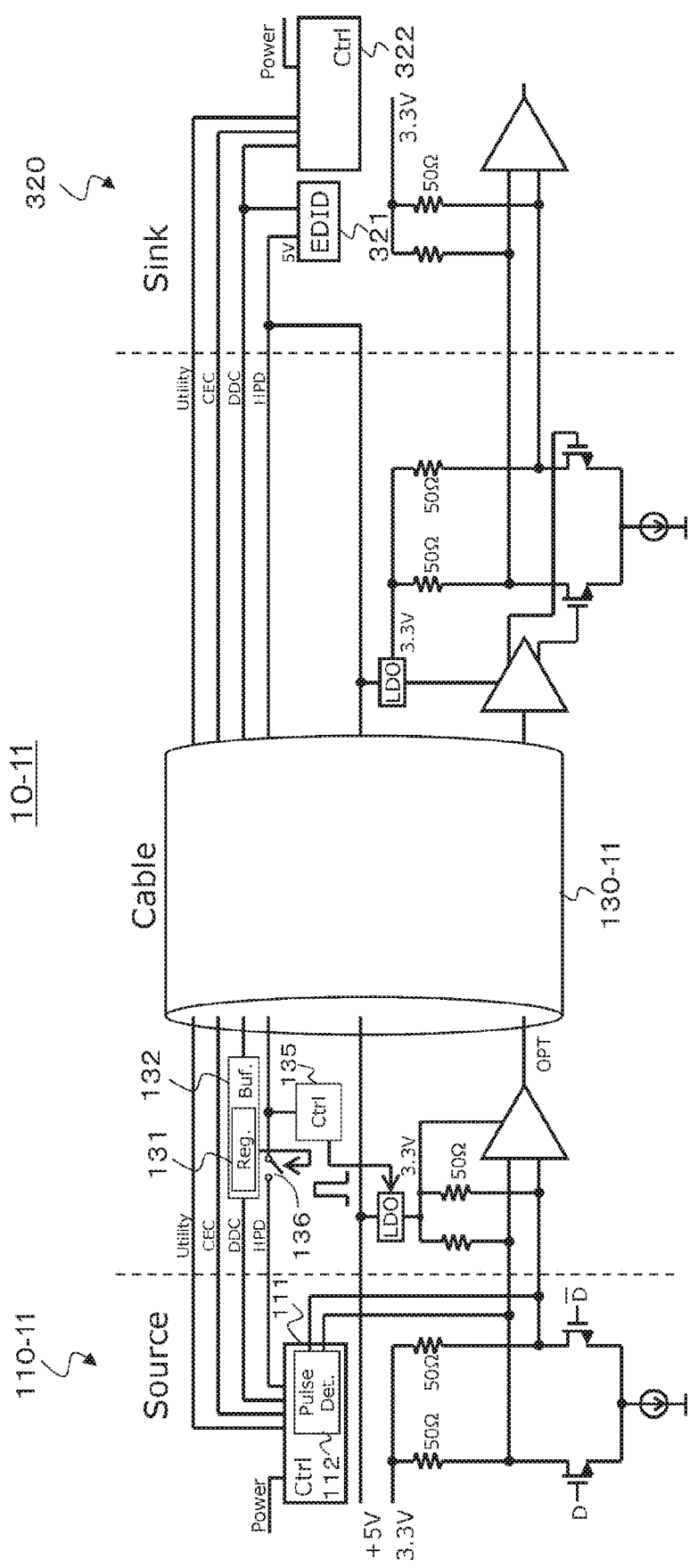
FIG. 26 explanatorily illustrates a method of transferring a connection sensed signal (HPD signal) to a source apparatus in order to shift to a normal sequence.
Figure 27:
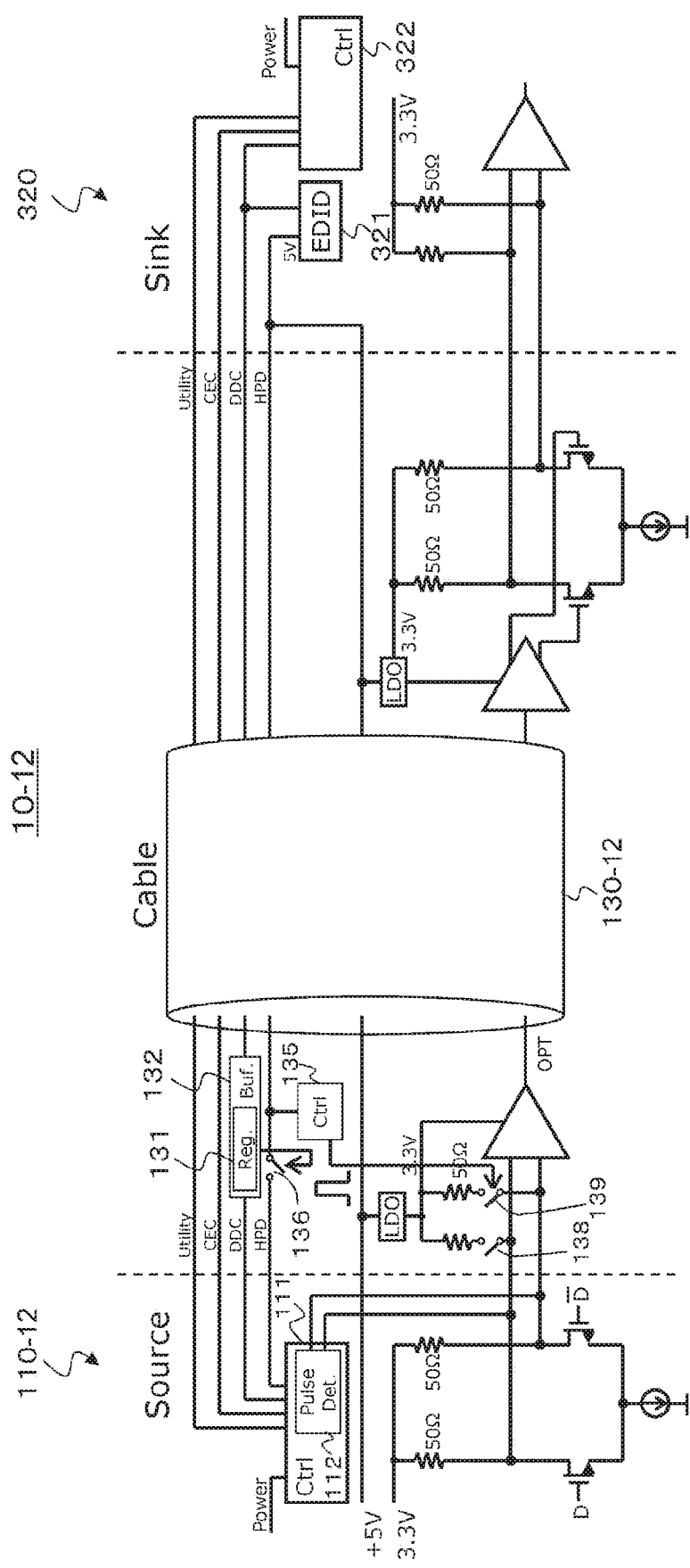
FIG. 27 explanatorily illustrates a method of transferring a connection sensed signal (HPD signal) to a source apparatus in order to shift to a normal sequence.

Furthermore, as illustrated in FIGS. 19 to 21, even in the case where the active circuit in the cable is turned on/off and a pulse is transmitted to the source apparatus, it is sufficient if a switch 136 is provided in an HPD line as in FIGS. 25 to 27 and the switch 136 is closed, for example, with a feedback signal from the source apparatus through a DDC line used as a trigger.

Thirteenth Embodiment

In the above description, the respective examples have been described in which the cable transmits the pulse information to the source apparatus and issues notification of the presence of the register to the source apparatus. However, it is also conceivable that the presence of a register is notified with a mechanical mechanism from a cable to a source apparatus, or the source apparatus senses with the mechanical mechanism that the register is present in the cable. In this case, for example, a mechanical mechanism of a connector is utilized.

Figure 28A:
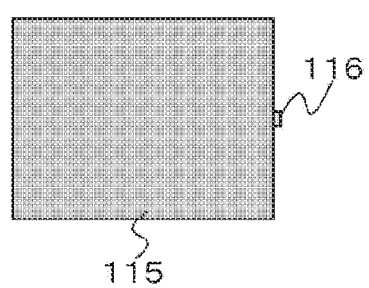
FIGS. 28A, 28B, 28C, 28D, 28E, and 28F illustrate an exemplary configuration of a connector at the time of issuing notification of the presence of a register from a cable to a source apparatus, with a mechanical mechanism.
Figure 28D:
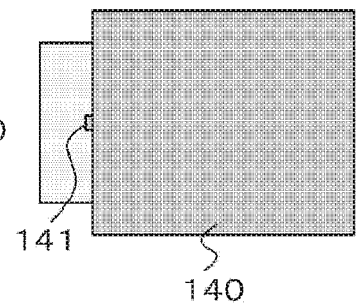
Figure 28B:
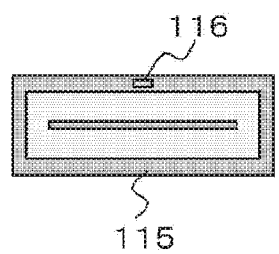
Figure 28E:
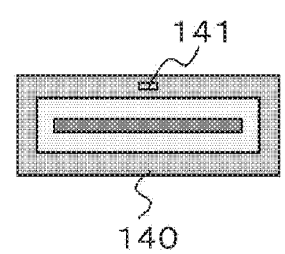
Figure 28C:
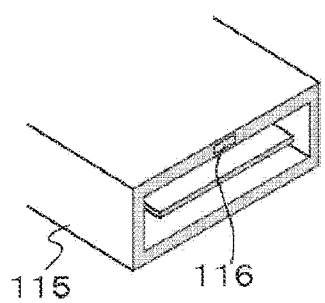
Figure 28F:
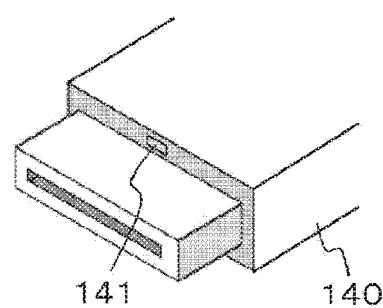

FIGS. 28A, 28B, 28C, 28D, 28E, and 28F illustrate an exemplary configuration of a connector. FIGS. 28A, 28B, and 28C respectively illustrate a plan view, a front view, and a perspective view of a receptacle 115 disposed in a source apparatus. In addition, FIGS. 28D, 28E, and 28F respectively illustrate a plan view, a front view, and a perspective view of a plug 140 provided at an end of a cable.

An electrode 116 is provided on the receptacle 115, and an electrode 141 is provided at the corresponding position also on the plug 140. The electrode 116 and the electrode 141 come into contact with each other at the time when the receptacle 115 and the plug 140 are fitted, and the presence of a register is notified from the cable to the source apparatus. As a result, the presence of the register in the cable is sensed in the source apparatus.

Figure 29A:
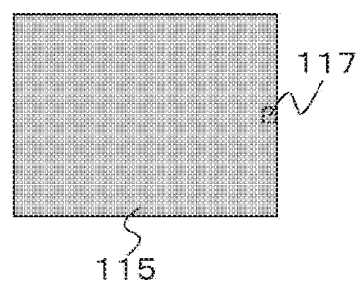
FIGS. 29A, 29B, 29C, 29D, 29E, and 29F illustrate an exemplary configuration of a connector at the time of issuing notification of the presence of a register from a cable to a source apparatus, with a mechanical mechanism.
Figure 29D:
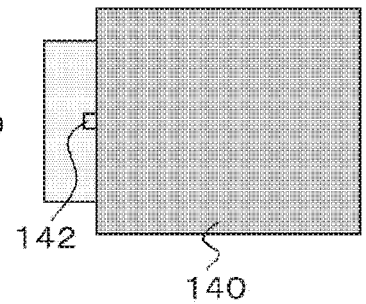
Figure 29B:
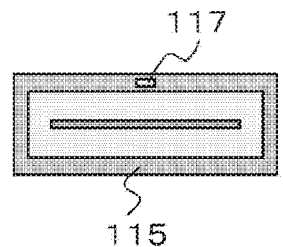
Figure 29E:
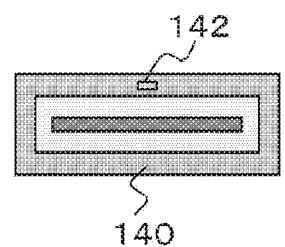
Figure 29C:
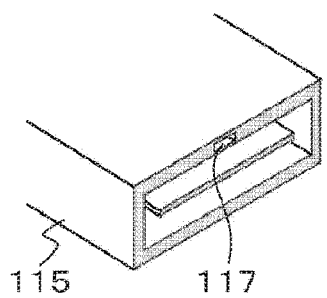
Figure 29F:
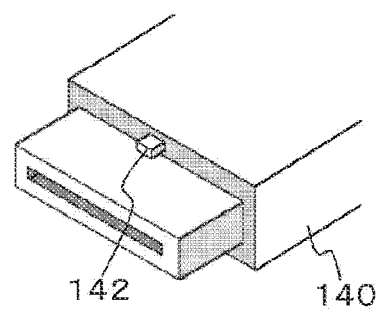

FIGS. 29A, 29B, 29C, 29D, 29E, and 29F illustrate another exemplary configuration of the connector. FIGS. 29A, 29B, and 29C respectively illustrate a plan view, a front view, and a perspective view of a receptacle 115 disposed in a source apparatus. In addition, FIGS. 29D, 29E, and 29F respectively illustrate a plan view, a front view, and a perspective view of a plug 140 provided at an end of a cable.

The receptacle 115 is provided with a recess (groove) 117, and a projection (protrusion) 142 is provided at the corresponding position also on the plug 140. Fitting of the recess 117 and projection 142 is sensed when the receptacle 115 and the plug 140 are fitted, and the presence of a register is notified from the cable to the source apparatus. As a result, the presence of the register in the cable is sensed in the source apparatus. Note that, conversely, the receptacle 115 may be provided with a projection and the plug 140 may be provided with a recess.

Figure 30A:
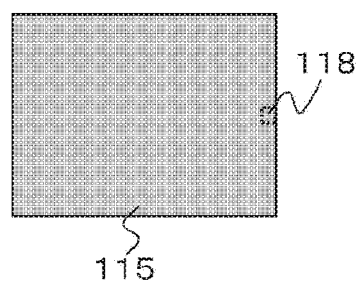
FIGS. 30A, 30B, 30C, 30D, 30E, and 30F illustrate an exemplary configuration of a connector at the time of issuing notification of the presence of a register from a cable to a source apparatus, with a mechanical mechanism.
Figure 30B:
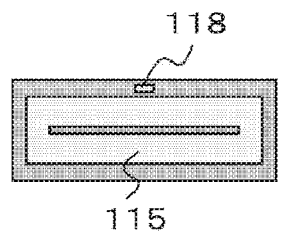
Figure 30C:
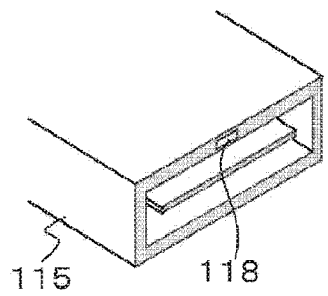
Figure 30D:
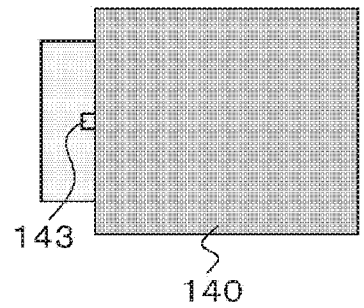
Figure 30E:
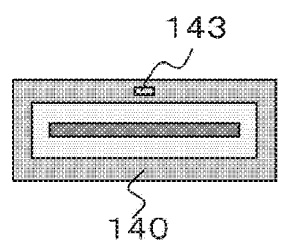
Figure 30F:
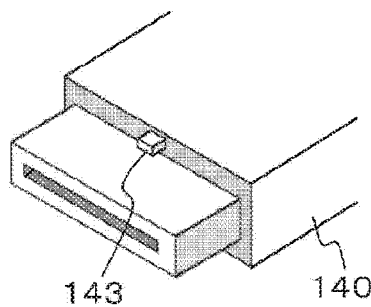

FIGS. 30A, 30B, 30C, 30D, 30E, and 30F illustrate yet another exemplary configuration of the connector. FIGS. 30A, 30B, and 30C respectively illustrate a plan view, a front view, and a perspective view of a receptacle 115 disposed in a source apparatus. In addition, FIGS. 30D, 30E, and 30F respectively illustrate a plan view, a front view, and a perspective view of a plug 140 provided at an end of a cable.

A switch 118 is provided on a receptacle 115, and a projection 143 is provided at the corresponding position also on the plug 140. The switch 118 is pushed by the projection 143 when the receptacle 115 and the plug 140 are fitted, and the presence of a register is notified from the cable to the source apparatus. As a result, the presence of the register in the cable is sensed in the source apparatus.

Figure 31A:
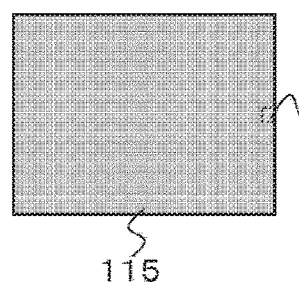
FIGS. 31A, 31B, 31C, 31D, 31E, and 31F illustrate an exemplary configuration of a connector at the time of issuing notification of the presence of a register from a cable to a source apparatus, with a mechanical mechanism.
Figure 31B:
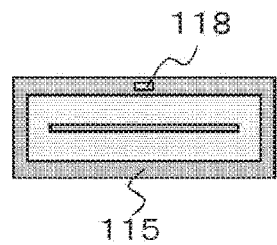
Figure 31C:
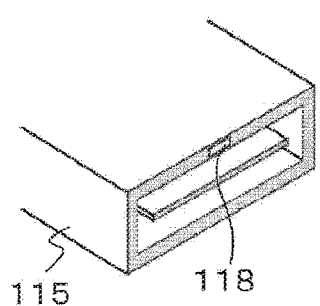
Figure 31D:
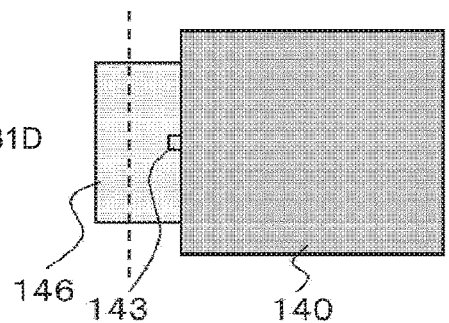
Figure 31E:
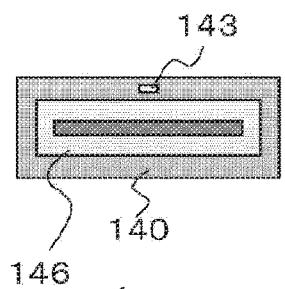
Figure 31F:
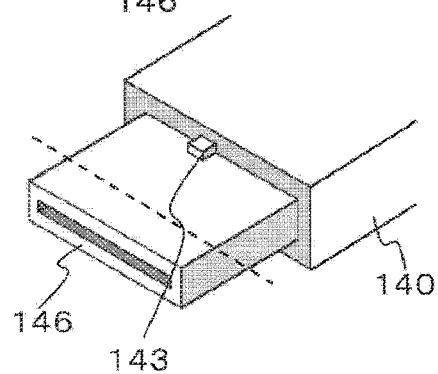

FIGS. 31A, 31B, 31C, 31D, 31E, and 31F illustrate yet another exemplary configuration of the connector. FIGS. 31A, 31B, and 31C respectively illustrate a plan view, a front view, and a perspective view of a receptacle 115 disposed in a source apparatus. In addition, FIGS. 31D, 31E, and 31F respectively illustrate a plan view, a front view, and a perspective view of a plug 140 provided at an end of a cable.

The receptacle 115 is provided with a switch 118 and a projection 143 is provided at the corresponding position also on the plug 140, which are the same as in the exemplary configuration of FIGS. 30A, 30B, 30C, 30D, 30E, and 30F. However, an insertion portion 146 of the plug 140, that is, a so-called port of the plug 140 is extended by the length of the projection 143. In this case, the projection 143 of the plug 140 and the switch 118 of the receptacle 115 come into contact with each other at fitting; however, the contact quality of communication terminal provided originally can be maintained. Furthermore, in this case, even if the new plug 140 is inserted into a legacy receptacle, the contact quality of the communication terminal can be maintained.

Fourteenth Embodiment

Figure 32:
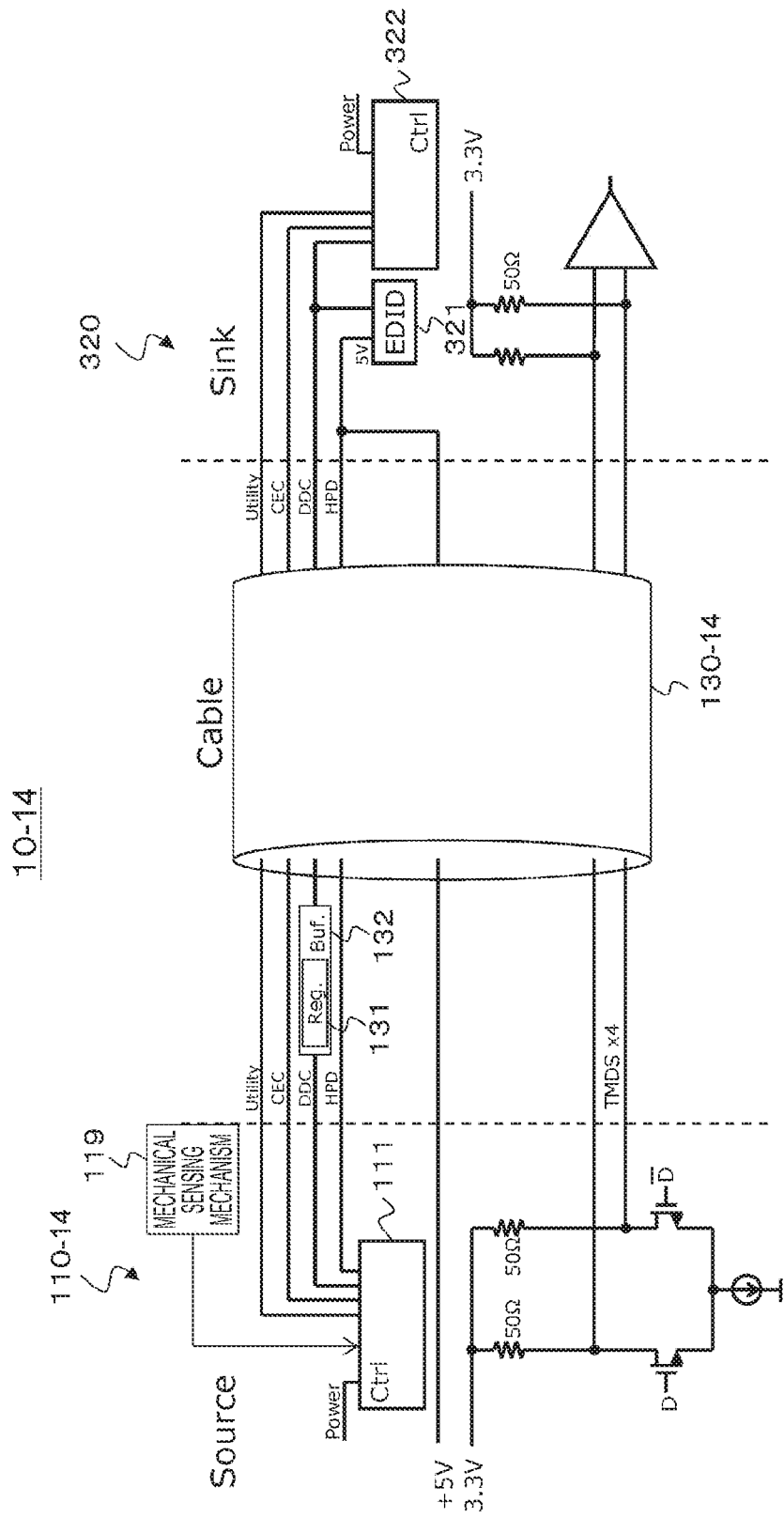
FIG. 32 illustrates an exemplary configuration of a transmission system as a fourteenth embodiment.

FIG. 32 illustrates an exemplary configuration of a transmission system 10-14 as a fourteenth embodiment. This exemplary configuration is an example in which a cable issues, with a mechanical mechanism (see FIGS. 28A, 28B, 28C, 28D, 28E, 28F, 29A, 29B, 29C, 29D, 29E, 29F, 30A, 30B, 30C, 30D, 30E, 30F, 31A, 31B, 31C, 31D, 31E, and 31F), notification to a source apparatus that the cable has a register with the cable specification data stored.

The transmission system 10-14 includes a source apparatus 110-14 serving as a transmission apparatus, a sink apparatus 320 serving as a reception apparatus, and an HDMI cable 130-14 that makes connection between the source apparatus 110-14 and the sink apparatus 320. In FIG. 32, parts corresponding to those in FIG. 11 are denoted by the same reference signs, and detailed description of the corresponding parts will be omitted.

In the transmission system 10-14, the source apparatus 110-14 includes a mechanical sensing mechanism 119. When the source apparatus 110-14 and the cable 130-14 are connected, it is sensed that the cable 130-14 retains a register 131 and information regarding the sensing is sent to a control unit 111, at the mechanical sensing mechanism 119. As a result, the control unit 111 of the source apparatus 110-14 determines that access to the register 131 of the cable 130-14 is allowable.

Fifteenth Embodiment

Figure 33:
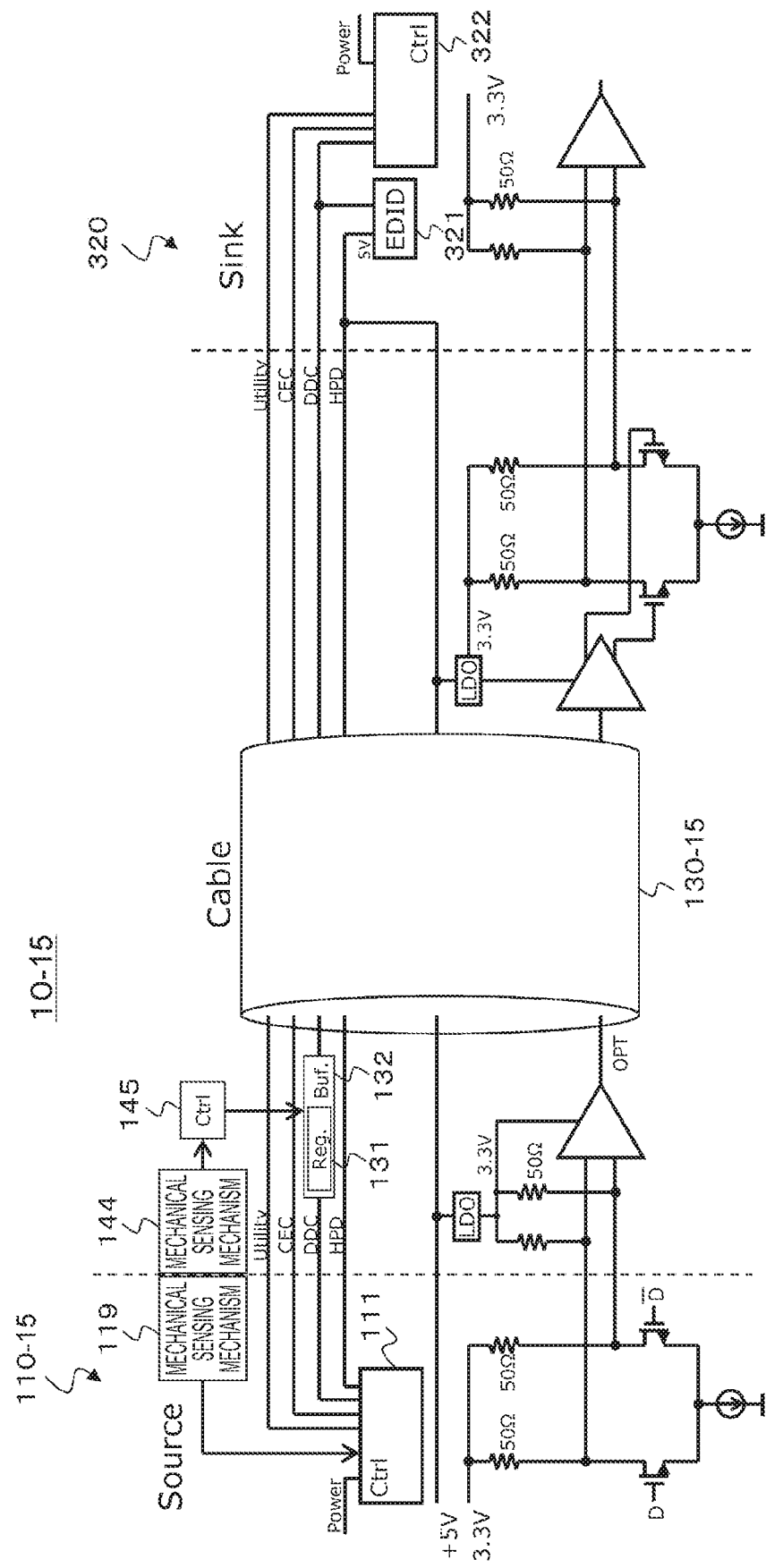
FIG. 33 illustrates an exemplary configuration of a transmission system as a fifteenth embodiment.

FIG. 33 illustrates an exemplary configuration of a transmission system 10-15 as a fifteenth embodiment. This configuration example is also an example in which a cable issues, with a mechanical mechanism (see FIGS. 28A, 28B, 28C, 28D, 28E, 28F, 29A, 29B, 29C, 29D, 29E, 29F, 30A, 30B, 30C, 30D, 30E, 30F, 31A, 31B, 31C, 31D, 31E, and 31F), notification to a source apparatus that the cable has a register with the cable specification data stored.

The transmission system 10-15 includes a source apparatus 110-15 serving as a transmission apparatus, a sink apparatus 320 serving as a reception apparatus, and an HDMI cable 130-15 that makes connection between the source apparatus 110-15 and the sink apparatus 320. In FIG. 33, parts corresponding to those in FIG. 32 are denoted by the same reference signs, and detailed description of the corresponding parts will be omitted.

In the transmission system 10-15, a cable 130-15 also includes a mechanical sensing mechanism 144. When the source apparatus 110-15 and the cable 130-15 are connected, it is sensed that the cable 130-15 has been connected to the corresponding source apparatus 110-15 and information regarding the sensing is sent to a control unit 145, at the mechanical sensing mechanism 144.

In this case, it is conceivable that the control unit 145 controls the operation of a buffer unit 132 on the basis of the information regarding the sensing. For example, in a case where no mechanical sensing has been made, the control unit 145 sets through mode in which a DDC signal is passed completely. In contrast, in a case where mechanical sensing has been made, the control unit 145 sets mode in which accessing to a register 131 from the source apparatus 110-15 is kept in the cable only, so that the power consumption of a buffer unit 132 can be controlled.

Sixteenth Embodiment

Figure 34:
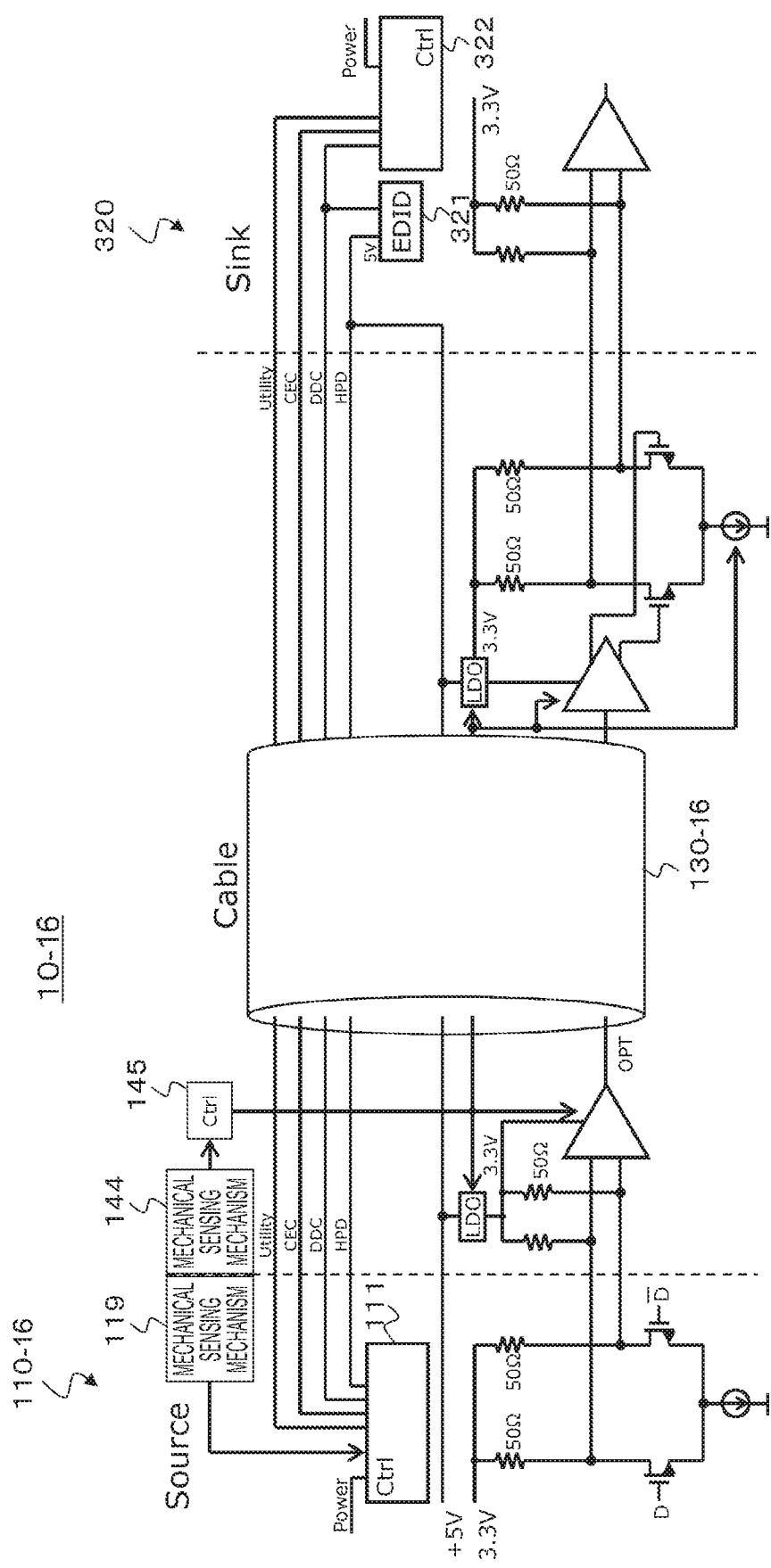
FIG. 34 illustrates an exemplary configuration of a transmission system as the fifteenth embodiment.

FIG. 34 illustrates an exemplary configuration of a transmission system 10-16 as a sixteenth embodiment. This exemplary configuration is an example in which control is performed such that the source apparatus senses, with a mechanical mechanism, the ability (capability) of flowing sufficient current and then a cable draws current from the source apparatus, that is, receives supply of current.

The transmission system 10-16 includes a source apparatus 110-16 serving as a transmission apparatus, a sink apparatus 320 serving as a reception apparatus, and an HDMI cable 130-16 that makes connection between the source apparatus 110-16 and the sink apparatus 320. In FIG. 34, parts corresponding to those in FIGS. 19 and 33 are denoted by the same reference signs, and detailed description of the corresponding parts will be omitted.

In the transmission system 10-16, the source apparatus 110-16 includes a mechanical sensing mechanism 119. At the mechanical sensing mechanism 119, when the source apparatus 110-16 and the cable 130-16 are connected, the cable 130-16 serves as an active device that consumes a large current, and in this example, the cable 130-16 is an active optical cable (AOC) with an active circuit built therein. Information regarding sensing of the mechanical sensing mechanism 119 is sent to a control unit 111. As a result, the control unit 111 of the source apparatus 110-14 recognizes that the cable 130-16 is a cable having an active device that consumes a large current.

In addition, in the transmission system 10-16, the cable 130-16 is also provided with a mechanical sensing mechanism 144. When the source apparatus 110-16 and the cable 130-16 are connected, it is sensed that the cable 130-16 has been connected to the corresponding source apparatus 110-16, that is, the source apparatus 110-16 having an ability (capability) of supplying a large current to the cable 130-16, and the information regarding the sensing is sent to a control unit 145, at the mechanical sensing mechanism 144.

In this case, the control unit 145 controls the operation of the active circuit on the basis of the information regarding the sensing. For example, in a case where no mechanical sensing has been made, the control unit 145 sets non-operation mode as a state where power supply to the active circuit is stopped. In contrast, in a case where mechanical sensing has been made, the control unit 145 sets operation mode as a state where power supply to the active circuit is performed. As described above, in the cable 130-16, control can be performed such that power supply is received only when the source apparatus can supply a predetermined current. Alternatively, the current amount consumed by the cable 130-16 is reduced to enable operation in low power mode. In addition, in this case, the sensing is performed with the mechanical mechanism. Thus, sensing is not performed with a signal from a DDC line or the like, and control can be performed easily and reliably.

2. Modifications

Note that, in the above embodiments, there has been described, as an example, the transmission system in which the source apparatus and the sink apparatus are connected with the HDMI cable. However, the present technology is also similarly applicable to a cable that adopts a mechanism defined in the "VESA Plug and Display (P & D) Specification" for connecting between a transmission apparatus and a reception apparatus. Thus, the present technology is also applicable to display visual interface (DVI), mobile high-definition link (MHL), Display Port, and the like. In addition, the present technology is not limited to an active optical cable (AOC) and an active copper cable (ACC), but is also applicative to, for example, wireless communication.

Furthermore, the present technology can also have configurations as described below.

(1) A transmission apparatus including:

an inquiry unit configured to perform an inquiry about presence or absence of a register to a cable connected between the transmission apparatus and a reception apparatus;

an information reception unit configured to receive information indicating the presence or absence of the register from the cable in response to the inquiry; and an access unit configured to access the register to acquire storage data or write in the storage data, when the information indicates the presence of the register.

(2) The transmission apparatus according to (1) described above, in which the register has stored specification data of the cable.

(3) The transmission apparatus according to (1) or (2) described above, in which the inquiry unit performs the inquiry after power is supplied to the reception apparatus via the cable.

(4) The transmission apparatus according to any of (1) to (3) described above, in which the information reception unit performs reading of function information regarding the reception apparatus through the cable, on the basis of a connection sensed signal from the cable, and receives the information indicating the presence or absence of the register.

(5) The transmission apparatus according to (4) described above, in which the cable serves as a high definition multimedia interface (HDMI) cable, and the information reception unit receives the connection sensed signal through a hot plug detect (HPD) line and reads the function information through a display data channel (DDC) line.

(6) A method of controlling a transmission apparatus, including:

an inquiry step of performing an inquiry about presence or absence of a register to a cable connected between the transmission apparatus and a reception apparatus, with an inquiry unit;

an information reception step of receiving information indicating the presence or absence of the register from the cable in response to the inquiry, with an information reception unit; and an access step of accessing, with an access unit, when the information indicates the presence of the register, the register to acquire storage data or write in the storage data.

(7) A cable to be connected between a transmission apparatus and a reception apparatus, the cable including:

a register;

an inquiry reception unit configured to receive an inquiry about presence or absence of the register from the transmission apparatus;

an information providing unit configured to provide information indicating the presence of the register to the transmission apparatus in response to the inquiry; and a buffer unit configured to perform blocking when access to the register is made from the transmission apparatus, such that information regarding the access is not sent to the reception apparatus.

(8) The cable according to (7) described above, in which the register has stored specification data of the cable.

(9) The cable according to (7) or (8) described above, in which the inquiry reception unit receives the inquiry after receiving a connection sensed signal sent from the reception apparatus corresponding to power supplied from the transmission apparatus to the reception apparatus via the cable.

(10) The cable according to (9) described above,
in which after reading function information from the reception apparatus, adding information indicating the presence of the register to the function information, and retaining the function information with the information indicating the presence of the register, the information providing unit sends a connection sensed signal to the transmission apparatus and causes the transmission apparatus to read the retained function information.

(11) A transmission apparatus including:
a sensing unit configured to sense that a register is present in a cable connected between the transmission apparatus and a reception apparatus; and
an access unit configured to access, when the presence of the register is sensed, the register to acquire storage data or write in the storage data.

(12) The transmission apparatus according to (11) describe above,
in which the register has stored specification data of the cable.

(13) The transmission apparatus according to (11) or (12) described above,
in which the sensing unit senses that the register is present in the cable, on the basis of a notification signal indicating the presence of the register sent from the cable.

(14) The transmission apparatus according to (13) described above,
in which the sensing unit receives pulse information provided on a predetermined line of the cable, as the notification signal.

(15) The transmission apparatus according to (11) or (12) described above,
in which the sensing unit senses that the register is present in the cable, with a mechanical mechanism.

(16) A method of controlling a transmitting apparatus, including:
a sensing step of sensing that a register is present in a cable connected between the transmission apparatus and a reception apparatus, with a sensing unit; and
an access step of accessing, when the presence of the register is sensed, the register to acquire storage data or write in the storage data, with an access unit.

(17) A cable to be connected between a transmission apparatus and a reception apparatus, the cable including:
a register;
an information providing unit configured to provide information indicating presence of the register to the transmission apparatus; and
a buffer unit configured to perform blocking when access to the register is made from the transmission apparatus, such that information regarding the access is not sent to the reception apparatus.

(18) The cable according to (17) described above,
in which the register has stored specification data of the cable.

(19) The cable according to (17) or (18) described above,
in which the information providing unit provides the information indicating the presence of the register to the transmission apparatus through a predetermined line of the cable.

(20) The cable according to (17) or (18) described above,
in which the information providing unit provides the information indicating the presence of the register to the transmission apparatus, with a mechanical mechanism.

(21) A transmission apparatus, including:
a notification unit configured to issue notification that a predetermined current is suppliable to a cable connected between the transmission apparatus and a reception apparatus.

(22) The transmission apparatus according to (21),
in which the notification unit issues the notification, with a mechanical mechanism.

(23) A cable to be connected between a transmission apparatus and a reception apparatus, the cable including:
a reception unit configured to receive notification that a predetermined current is suppliable from the transmission apparatus; and
a control unit configured to perform control such that the supply of the current is received from the transmission apparatus after the reception of the notification.

(24) The cable according to (23) described above,
in which the reception unit receives the notification, with a mechanical mechanism.

REFERENCE SIGNS LIST

10-1 to 10-16, 10-1A Transmission system
110, 110-2 to 110-16 Source apparatus
111 Control unit
112 Pulse detection unit
115 Receptacle
116 Electrode
117 Recess
118 Switch
119 Mechanical sensing mechanism
130, 130-2 to 130-16 HDMI cable
131 Register
132 Buffer unit
133 Register
135 Control unit
136 to 139 Switch
140 Plug
141 Electrode
142 Projection
143 Projection
144 Mechanical sensing mechanism
145 Control unit
146 Terminal
320 Sink apparatus
321 EDID ROM
322 Control unit
341 Power line
342 DCC line
343 HPD line

The invention claimed is:
1. A transmission apparatus, comprising:
circuitry configured to:
perform an inquiry, about one of a presence or an absence of a register, to a cable, wherein
the cable is connected between the transmission apparatus and a reception apparatus;
receive information, indicating one of the presence or the absence of the register, from the cable, wherein
the received information is in response to the inquiry; and
access the register to one of acquire storage data or write in the storage data, based on the information that indicates the presence of the register.
2. The transmission apparatus according to claim 1, wherein the register stores specification data of the cable.

3. The transmission apparatus according to claim 1, wherein
the circuitry is further configured to perform the inquiry after supply of power to the reception apparatus via the cable.

4. The transmission apparatus according to claim 1, wherein
the circuitry is further configured to:
receive a connection sensed signal from the cable;
read function information regarding the reception apparatus through the cable, based on the received connection sensed signal; and
receive the information indicating one of the presence or the absence of the register, based on the read of function information.

5. The transmission apparatus according to claim 4, wherein
the cable is a high definition multimedia interface (HDMI) cable, and
the circuitry is further configured to:
receive the connection sensed signal through a hot plug detect (HPD) line; and
read the function information through a display data channel (DDC) line.

6. A method of controlling a transmission apparatus, comprising:
performing, by circuitry, an inquiry, about one of a presence or an absence of a register, to a cable, wherein the cable is connected between the transmission apparatus and a reception apparatus;
receiving, by the circuitry, information, indicating one of the presence or the absence of the register, from the cable, wherein
the received information is in response to the inquiry; and
accessing, by the circuitry, the register to one of acquire storage data or write in the storage data, based on the information that indicates the presence of the register.

7. A cable, comprising:
a register;
circuitry configured to:
receive an inquiry, about one of a presence or an absence of the register, from a transmission apparatus; and
transmit information indicating the presence of the register to the transmission apparatus, wherein
the transmitted information is in response to the inquiry; and
a buffer unit configured to perform blocking when access to the register is made from the transmission apparatus, such that information regarding the access is not sent to a reception apparatus.

8. The cable according to claim 7, wherein
the register is configured to store specification data of the cable.

9. The cable according to claim 7, wherein
the circuitry is further configured to:
receive a connection sensed signal from the reception apparatus; and
receive the inquiry after the receipt of the connection sensed signal, and
the connection sensed signal corresponds to power supplied from the transmission apparatus to the reception apparatus via the cable.

10. The cable according to claim 9, wherein
the circuitry is further configured to:
read function information from the reception apparatus;
add, subsequent to the read of the function information, information indicating the presence of the register to the function information;
retain the function information with the information indicating the presence of the register; and
transmit a connection sensed signal to the transmission apparatus, wherein
the transmission apparatus reads the retained function information, based on the connection sensed signal.

11. A transmission apparatus, comprising:
circuitry configured to:
receive a notification signal from a cable, wherein the notification signal is based on a turn on of a switch in the cable;
sense that a register is present in the cable, based on the received notification signal that indicates the presence of the register, wherein
the cable is connected between the transmission apparatus and a reception apparatus; and
access, when the presence of the register is sensed, the register to one of acquire storage data or write in the storage data.

12. The transmission apparatus according to claim 11, wherein the register stores specification data of the cable.

13. The transmission apparatus according to claim 11, wherein
the circuitry is further configured to receive pulse information, as the notification signal, via a specific line of the cable.

14. The transmission apparatus according to claim 11, wherein
the circuitry is further configured to sense that the register is present in the cable, with a mechanical mechanism.

15. A method of controlling a transmission apparatus, comprising:
receiving, by circuitry, a notification signal from a cable, wherein
the notification signal is based on a turn on of a switch in the cable;
sensing, by the circuitry, that a register is present in the cable, based on the received notification signal that indicates the presence of the register, wherein
the cable is connected between the transmission apparatus and a reception apparatus; and
accessing, by the circuitry, when the presence of the register is sensed, the register to one of acquire storage data or write in the storage data.

16. A cable comprising:
a register;
a switch;
circuitry configured to:
transmit information indicating a presence of the register to a transmission apparatus, wherein
the information is transmitted based on a turn on of the switch; and
a buffer unit configured to perform blocking when access to the register is made from the transmission apparatus, such that information regarding the access is not sent to a reception apparatus.

17. The cable according to claim 16, wherein the register is configured to store specification data of the cable.

18. The cable according to claim 16, wherein
the circuitry is further configured to transmit the information indicating the presence of the register to the transmission apparatus through a specific line of the cable.

19. The cable according to claim 16, wherein
the circuitry is further configured to provide the information indicating the presence of the register to the transmission apparatus, with a mechanical mechanism.

20. A transmission apparatus, comprising:
circuitry configured to:
   receive information from a mechanical sensing mechanism, wherein the received information indicates that the transmission apparatus and a cable are connected; and
   issue notification that a specific current is suppliable to the cable when the transmission apparatus and the cable are connected, wherein
      the cable is connected between the transmission apparatus and a reception apparatus.

21. A cable, comprising:
circuitry configured to:
   receive notification that a specific current is suppliable from a transmission apparatus; and
   control, a supply of the specific current from the transmission apparatus, after the reception of the notification, wherein
      the received notification that the specific current is suppliable to the cable when the transmission apparatus and the cable are connected, and
      the connection between the transmission apparatus and the cable is indicated by information from a mechanical sensing mechanism.

* * * * *